(12) United States Patent
Aschwanden et al.

(10) Patent No.: US 10,845,570 B2
(45) Date of Patent: Nov. 24, 2020

(54) OPTICAL DEVICE FOR ENHANCING RESOLUTION OF AN IMAGE

(71) Applicant: Optotune AG, Dietikon (CH)

(72) Inventors: Manuel Aschwanden, Allenwinden (CH); David Niederer, Kuttigen (CH); Mark Ventura, Cham (CH); Marcel Suter, Zurich (CH); David Stadler, Zurich (CH); Stephan Smolka, Zurich (CH); Roman Patscheider, Winterthur (CH); Markus Geissner, Bergdietikon (CH)

(73) Assignee: OPTOTUNE AG, Dietikon (CH)

( * ) Notice: Subject to any disclaimer, the term of this patent is extended or adjusted under 35 U.S.C. 154(b) by 320 days.

(21) Appl. No.: 15/548,779

(22) PCT Filed: Feb. 6, 2016

(86) PCT No.: PCT/EP2016/052580
§ 371 (c)(1),
(2) Date: Aug. 4, 2017

(87) PCT Pub. No.: WO2016/124782
PCT Pub. Date: Aug. 11, 2016

(65) Prior Publication Data
US 2018/0011285 A1 Jan. 11, 2018

(30) Foreign Application Priority Data
Feb. 6, 2015 (WO) ................ PCT/EP2015/052564

(51) Int. Cl.
*H04N 9/31* (2006.01)
*G02B 7/182* (2006.01)
(Continued)

(52) U.S. Cl.
CPC ....... *G02B 7/1821* (2013.01); *G02B 26/0816* (2013.01); *G02B 26/0875* (2013.01);
(Continued)

(58) Field of Classification Search
CPC ...... H04N 9/31; H04N 9/3141; H04N 9/3188; H04N 5/74; H04N 5/7458; G02B 7/1821;
(Continued)

(56) References Cited

U.S. PATENT DOCUMENTS

| 4,385,373 A | 5/1983 | Howe |
| 4,920,418 A | 4/1990 | Robinson |

(Continued)

FOREIGN PATENT DOCUMENTS

| CN | 1906929 | 1/2007 |
| EP | 0653657 | 5/1995 |

(Continued)

*Primary Examiner* — Trang U Tran
(74) *Attorney, Agent, or Firm* — JMB Davis Ben-David

(57) ABSTRACT

The invention relates to an optical device (1) for enhancing the resolution of an image, comprising: a transparent plate member (10) configured for refracting a light beam (20) passing through the plate member (10), which light beam (20) projects an image comprised of rows and columns of pixels (40), a carrier (50) to which said transparent plate member (10) is rigidly mounted, wherein the carrier (50) is configured to be tilted between a first and a second position about a first axis (A), such that the plate member (10) is tilted between the first and the second position about the first axis (A), whereby said projected image (30) is shifted by a fraction (ΔP) of a pixel, particularly by a half of a pixel, along a first direction (x), and an actuator means (60) that is configured to tilt the carrier (50) and therewith the plate member (10) between the first and the second position about the first axis (A).

46 Claims, 27 Drawing Sheets

(51) Int. Cl.
  *G02B 26/08* (2006.01)
  *G02B 26/10* (2006.01)
  *H04N 5/74* (2006.01)
(52) U.S. Cl.
  CPC ........... *G02B 26/10* (2013.01); *H04N 5/7458* (2013.01); *H04N 9/3141* (2013.01); *H04N 9/3188* (2013.01)
(58) Field of Classification Search
  CPC . G02B 26/0816; G02B 26/0875; G02B 26/10
  USPC .................................................. 348/764, 771
  See application file for complete search history.

(56) References Cited

U.S. PATENT DOCUMENTS

| | | | |
|---|---|---|---|
| 5,402,184 A | | 3/1995 | O'Grady |
| 5,786,901 A | | 7/1998 | Okada et al. |
| 5,877,806 A | | 3/1999 | Kawano |
| 6,989,921 B2 | * | 1/2006 | Bernstein .............. B81B 3/0062 359/224.1 |
| 7,170,665 B2 | * | 1/2007 | Kaneko ................... G02B 7/02 310/22 |
| 7,279,812 B2 | | 10/2007 | Barnes |
| 2003/0190116 A1 | | 10/2003 | Freeman |
| 2004/0061960 A1 | | 4/2004 | Heaton |
| 2006/0007057 A1 | | 1/2006 | Choi |
| 2006/0158046 A1 | | 7/2006 | Barnes |

FOREIGN PATENT DOCUMENTS

| | | |
|---|---|---|
| EP | 0745881 | 12/1996 |
| JP | A-1997051483 | 2/1997 |
| JP | A-2000032317 | 1/2000 |

\* cited by examiner

OPTICAL DEVICE FOR ENHANCING RESOLUTION OF AN IMAGE

Cross-Reference to Related Applications

This is the U.S. National Stage of International Application No. PCT/EP2016/052580 filed on Feb. 6, 2016, which was published in English under PCT Article 21(2), which in turn claims the benefit of International Application No. PCT/EP2015/052564 filed on Feb. 6, 2015.

The present invention relates to an optical device for enhancing resolution of an image according to claim 1.

Such an optical device usually comprises a transparent plate member (e.g. glass window) configured for refracting a light beam passing through the plate member, which light beam projects an image comprised of rows and columns of pixels, as well as a carrier to which said transparent plate member is rigidly mounted, wherein the carrier is configured to be tilted between a first and a second position about a first axis, such that the plate member is tilted back and forth between the first and the second position about the first axis, whereby said projected image is shifted by a fraction of a pixel (usually by a half of a pixel) along a first direction. The device further comprises an actuator means that is configured to tilt the carrier and therewith the plate member between the first and the second position about said first axis. Optical devices of this kind are for instance disclosed in U.S. Pat. No. 7,279,812 as well as in U.S. Pat. No. 5,402,184.

The afore-mentioned enhancement of an image by overlapping of pixels is also known as super resolution projection or imaging. Here, e.g. a temporal sequence of frames is split into two sub-frames, wherein to successive sub-frames may be displaced with respect to each other by a fraction of a pixel (e.g. one-half or one-third). The sub-frames are projected in a sufficiently fast manner so that they appear to the human eye as if they are being projected simultaneously and superimposed. For instance, in case the sub-frames are aligned such that the corners of the pixels in one sub-frame are projected on the centers of the next sub-frame and so on, the illusion of a resolution can be achieved that seems twice as high. These kind of pixel shifting can be performed in one dimension (e.g. shifting in x-direction), but may also be performed in two dimensions (2D), e.g. shifting in x- as well as in y-direction of the image (i.e. shifting along the rows and columns of the digital image).

Based on the above the problem underlying the invention is to provide for an improved optical device for generating such a super resolution image which consumes only a small installation space and provides an effective and reliable actuation of the refracting plate member (e.g. glass plate).

This problem is solved by an optical device having the features of claim 1. According thereto, the optical device comprises a transparent plate member configured for refracting a light beam passing through the plate member, which light beam projects an image comprised of rows and columns of pixels, a carrier to which said transparent plate member is rigidly mounted, wherein the carrier is configured to be tilted between at least a first and a second position about a first axis, such that the plate member is tilted between the first and the second position about the first axis, whereby said projected image is shifted by a fraction of a pixel, particularly by a half of a pixel, along a first direction, and an actuator means that is configured to tilt the carrier and therewith the plate member between the first and the second position about the first axis.

For refracting the light beam, the plate member may have a refractive index of about n=1.5 as an example. Other suitable values may also be used.

Particular embodiments of the present invention are stated in the sub-claims and are described below.

Particularly, the optical device according to the invention can be used in (e.g. super resolution) imaging and projection. In these contexts, the optical device presented here may form a component in a camera or a projector. In a camera, an image projected onto a sensor comprising pixels According to a preferred embodiment of the present invention, said actuator means is formed as a reluctance actuator means that is designed to exert a reluctance force on the carrier to tilt the carrier and therewith the plate member between the first and the second position about the first axis.

According to an embodiment of the present invention the optical device comprises a support to which the carrier is mounted or to which the carrier is integrally connected such that it is tiltable about the first axis (particularly with respect to the support), wherein particularly the support surrounds the carrier (see also below).

Further, according to an embodiment of the present invention, the reluctance actuator means comprises a first electrically conducting coil mounted on a first magnetic flux return structure that is connected to the support, and a first magnetic flux guiding structure connected (e.g. integrally) to the carrier or formed by the carrier, wherein said first magnetic flux guiding structure is separated from said first magnetic flux return structure by a first gap, and wherein the reluctance actuator means comprises a second electrically conducting coil mounted on a second magnetic flux return structure that is connected to the support, and a second magnetic flux guiding structure connected (e.g. integrally) to the carrier or formed by the carrier, wherein said second magnetic flux guiding structure is separated from said second magnetic flux return structure by a second gap.

Each gap is preferably formed such that it can be reduced by tilting the carrier. For instance, this can be achieved by arranging the magnetic flux guiding structures at a vertical position (height) along a normal of the plate member that differs from the vertical position of the associated magnetic field return structure. For instance, the magnetic flux guiding structures may be arranged above or below the magnetic flux return structures.

Preferably, the magnetic flux return structure(s) as well as the magnetic flux guiding structure(s) described herein are preferably formed out of or comprise a magnetically soft material such as iron, a magnetically soft ferrite or another suitable material. These structures may also be formed out of steel. Said structures are designed to guide and bundle the magnetic flux. Further, the transparent plate member can be made out of any suitable material or comprise such a material, particularly glass.

Particularly, in all embodiments, the plate member comprises two parallel, flat surfaces that face away from each other and extend along the extension plane of the plate member. Thus, a light beam passing the plate member gets refracted at each plate member surface and finally the incident light beam runs parallel to the transmitted light beam. Particularly the first and second position, i.e., the tilting angle, is selected such that the shift of the transmitted light beam corresponds to a fraction (e.g. one-half) of a pixel of the image.

According to an embodiment of the present invention the first magnetic flux return structure is arranged on a first region of the support, while the second magnetic flux return structure is arranged on an opposing second region of the support. Particularly, the carrier is arranged between the two return structures and may also be arranged between said two opposing regions of the support.

Particularly, the support forms a circumferential support frame having a first leg formed by the first region and a second leg formed by the second region, wherein the two legs extend along each other (particularly parallel to each other) and are connected to each other (e.g. integrally) by a third and fourth leg (or region) so as to form said support frame. Thus, the support frame delimits an aperture in which the carrier may be arranged. Particularly, the support frame is a rectangular (e.g. square) support frame. However, the support frame can have also different shapes, particularly as long as magnetic return structures including the coils can be attached to the frame. Circular frames are also feasible by creating correspondingly curved return structures.

Further, particularly, the support (or support frame) and the carrier or transparent plate member each extend along an extension plane, wherein the extension plane of the carrier or plate member may comprise a tilt with respect to the extension plane of the support when the carrier (plate member) resides in the first or second position.

Herein, particularly, the notion extension plane means that the respective component has larger dimensions in this extension plane than perpendicular to the extension plane.

With respect to the light beam that is to be displaced by a fraction of a pixel so as to enhance the resolution of the projected image, the extension plane of the transparent plate member is arranged such that the light beam is incident on the plate member, and depending on the tilt of the plate member or carrier, is displaced by a fraction of a pixel (e.g. one-half pixel)

Generally, the extension plane of the plate may run substantially perpendicular to the light beam.

According to an embodiment of the present invention the carrier is elastically coupled to said support so that a restoring force is generated when the carrier is arranged in the first position or in the second position, which restoring force tries to move the carrier out of the respective (first or second) position and towards the other (second or first) position or a resting position.

Further, depending on the respective gap between the associated magnetic flux return and guiding structures, a hard stop can be employed in order to reduce vibrations of the optical device due to the frequency of the tilting movement, which particularly lies within the range from 30 Hz to 500 Hz.

For this, according to an embodiment of the present invention, the optical device comprises a first stopping means configured to stop the carrier in the first position, as well as a second stopping means configured to stop the carrier in the second position. Here, particularly, the first stopping means provides a (hard) stop for the first magnetic flux guiding structure when the carrier arrives in the first position, while the second stopping means particularly provides a (hard) stop for the second magnetic flux guiding structure when the carrier arrives in the second position.

Particularly, according to an embodiment, the first stopping means comprises a surface area of the first magnetic flux return structure or of the support. Likewise, particularly, according to an embodiment, the second stopping means comprises a surface area of the second magnetic flux return structure or of the support.

Thus, particularly, either the two return structures themselves or the support provides a (hard) stop by letting the carrier, particularly the magnetic flux guiding structures hit said surface areas. For noise reduction, said first and said second stopping means each comprise a damping member that is arranged on the respective surface area for damping an impact of the respective magnetic flux guiding structure/carrier on the respective surface area. The damping members may each comprise a cavity that opens towards the carrier or magnetic flux guiding member that is to be stopped, wherein a flexible, particularly incompressible, material (e.g. silicon) is arranged in the respective cavity so that the material protrudes out the respective cavity and can thus be deformed by the approaching carrier/magnetic flux guiding structure.

Further, according to an embodiment of the present invention, the first gap is at least delimited by a face side of the first magnetic flux return structure and a face side of the associated first magnetic flux guiding structure.

Further, particularly, the second gap is at least delimited by a face side of the second magnetic flux return structure and a face side of the associated second magnetic flux guiding structure.

In such a situation, the respectively generated reluctance force can have an essentially linear course as a function of the (vertical) distance between the respective return and associated guiding structure.

For providing essentially quadratic reluctance forces with respect to said distance, the first gap is further delimited in an embodiment by said surface area of the first magnet flux return structure. Likewise, particularly, the second gap is then further delimited by said surface area of the second magnetic flux return structure. Hence a first and a second gap result that enclose an angle (particularly 90°) in cross section. A further possibility is to provide merely a gap between surface areas and no face side contribution.

Alternatively or in addition, the optical device may further comprises a roll-off spring member for vibration/noise reduction according to an embodiment of the present invention, which roll-off spring member is particularly connected to the carrier and is designed to roll off on a roll-off surface (connected to the support) when the carrier is tilted back and forth between the first and the second position.

In all embodiments, the optical device preferably comprises an electric energy source and a control unit configured to cause the electric energy source to apply current signals to the electrically conducting coils, particularly independently so that reluctance forces can be generated for tilting the carrier, e.g. with a pre-defined frequency.

According to an embodiment of the present invention the control unit is configured to apply a first current to said first coil and a second current to said second coil such that when the first current is applied to the first coil, magnetic flux generated by the first coil is guided by the first magnetic flux return structure and the first magnetic flux guiding structure via said first gap resulting in a reluctance force that tilts the carrier into the first position so as to reduce said gap, and such that when the second current is applied to the second coil, magnetic flux generated by the second coil is guided by the second magnetic flux return structure and the second magnetic flux guiding structure via said second gap resulting in a reluctance force that tilts the carrier into the second position so as to reduce said second gap. In other words, by applying the first current the first gap is reduced and by applying a second current the second gap is reduced, respectively. Here, particularly, the current signals for the first and second coil are shaped such that they do not interfere in an unwanted manner or counteract each other. Thus, particularly, the control unit is configured to cause the electric energy source to apply the first current and the second current such that the carrier is tilted back and forth between the first and the second position according to a predefined pattern.

According to an embodiment of the present invention the control unit is configured to cause the electric energy source to generate an optimized drive signal (current), wherein one coil is used for accelerating the carrier into a certain position while the opposing coil is used for decelerating the carrier shortly after the acceleration, namely when the carrier approaches the respective (first or second position). After the decelerating signal, the other (accelerating) coil may apply a constant current signal so as to hold the carrier over a pre-defined time interval in the respective (first or second) position.

According to an embodiment of the present invention the carrier comprises a circumferential (e.g. circular) first frame member or is formed as such a first frame member, to which first frame member said transparent plate member is connected (e.g. rigidly mounted). Particularly, the first frame member forms an aperture for the passage of the light beam through the first frame member (and through the transparent plate member), wherein said first frame member is elastically coupled via at least a first bar, particularly two first bars, which are preferably aligned with each other (and particularly with the first axis), to said support. The first frame member can be integrally formed with the first and the second magnetic flux guiding structure, the first bars as well as with legs connected to the first bars, which legs are connected to associated legs or regions of the support. The first frame member together with the magnetic flux guiding structures, the first bars and said legs can be formed out of a single metal plate. Preferably out of a magnetically soft material (see above).

Particularly, the first magnetic flux guiding structure is (e.g. integrally) connected to a first section of the first frame member, which first section faces a second section of the first frame member, to which second section the second magnetic flux guiding structure is (e.g. integrally connected). Particularly both sections lie on opposing sides of an aperture formed by the first frame member, through which aperture the light beam passes for passing through the transparent plate member that refracts the light beam and finally shifts the image by said fraction of a pixel of the image.

Particularly, the first axis runs along or parallel to the first and the second region/leg of the support, wherein the first axis runs parallel to the extension planes of the support and the carrier.

According to a further embodiment of the present invention, the carrier comprises a first carrier member to which the first and the second magnetic flux guiding structures are connected, wherein particularly the first magnetic flux guiding structure is (e.g. integrally) connected to a first section of the first frame member, which first section faces a second section of the first carrier member, to which second section the second magnetic flux guiding structure is (e.g. integrally) connected. Particularly the first carrier member is connected to a second carrier member by a bar that is supported on the support, wherein the first carrier member is arranged in an aperture formed by the support, and wherein the second carrier member, to which the plate member is connected is arranged outside said aperture, i.e., outside said support, so that a leg (or region) of the support extends between the first and the second carrier member.

Further, according to an embodiment of the present invention, the reluctance actuator means further comprises a third electrically conducting coil mounted on a third magnetic flux return structure that is connected to the support, and a third magnetic flux guiding structure connected to the carrier, wherein said third magnetic flux guiding structure is separated from said third magnetic flux return structure by a third gap, and wherein the reluctance actuator means comprises a fourth electrically conducting coil mounted on a fourth magnetic flux return structure that is connected to the support, and a fourth magnetic flux guiding structure connected to the carrier, wherein said fourth magnetic flux guiding structure is separated from said fourth magnetic flux return structure by a fourth gap.

According to an embodiment of the present invention, the third magnetic flux return structure is arranged on the first region of the support besides the first magnetic flux return structure and the fourth magnetic flux return structure is arranged on the second region of the support besides the second magnetic flux return structure.

Here, particularly, the first and the second magnetic flux return structure are arranged at a first height with respect to the support, and the third and the fourth magnetic flux return structure are arranged at a different (e.g. higher) second height with respect to the support. Particularly, when the carrier is tilted into the first position, the first and the fourth gap are minimal. Furthermore, particularly, when the carrier is tilted into the second position, the second and the third gap are minimal.

Furthermore, in this embodiment, the control unit is particularly configured to cause the electric energy source to apply a first current to said first coil and at the same time a fourth current to said fourth coil so that two reluctance forces are generated that reduce the first and the fourth gap at the same time and tilt the carrier into its first position. Further, particularly, the control unit is configured to cause the electric energy source to apply a second current to said second coil and at the same time a third current to said third coil so that two reluctance forces are generated that reduce the second and the third gap at the same time and tilt the carrier into its second position. Particularly, the control unit may be configured to cause the electric energy source to apply said four currents such that the carrier is tilted back and forth between the first and the second position according to a predefined pattern.

Further, according to an embodiment of the present invention, the optical device may also be configured to shift the projected image in 2D in the image plane.

For this, according to an embodiment of the present invention, the optical device may further comprises a
  a further transparent plate member configured for refracting said light beam extending along the other plate member,
  a further carrier to which said further transparent plate member is rigidly mounted, wherein the further carrier is configured to be tilted back and forth between a third and a fourth position about a second axis, such that the further plate member is tilted between the third and the fourth position about the second axis, whereby said projected image is shifted by a fraction of a pixel (particularly by a half of a pixel) along a second direction, and
  a further actuator means that is configured to tilt the further carrier and therewith the further plate member between the third and the fourth position about the second axis, wherein said further actuator means is formed as a further reluctance actuator means that is designed to exert a reluctance force on the further carrier to tilt the further carrier and therewith the further plate member between the third and the fourth position about the second axis, and wherein particularly the further carrier is mounted to a further support that is stacked on top of the support such that the further carrier can be tilted about the second axis.

Thus, such a 2D-device can be obtained by stacking 2 1D-devices as described above on top of each other.

However, it is also possible to use the same support and mount the further components thereon.

Furthermore, it is also possible to design a 2D optical device for shifting the projected image in 2D (e.g. horizontally along the x-axis, or vertically along the y-axis).

According to such an embodiment of the present invention, the first magnetic flux return structure is arranged on the first region or leg of the support, while the second magnetic flux return structure is arranged on the second region or leg of the support, wherein the first and the second region (leg) as well as the first and the second magnetic flux return structure face each other. The same holds for the third and the fourth magnetic flux return structure and attached coils: the third magnetic flux return structure is arranged on the third region or leg of the support, while the fourth magnetic flux return structure is arranged on the fourth region or leg of the support, wherein the third and the fourth region (leg) as well as the third and the fourth magnetic flux return structure face each other. Here, said regions or legs of the support particularly form a circumferential support frame defining an aperture in the center of the support in which the carrier and the transparent plate member reside in a 2D-tiltable fashion. Specifically, the first region extends along the second region (particularly parallel to each other), while the third and the forth region connect the first and second region to each other. Also the third and the fourth region extend along each other (particularly parallel to each other) so that a support frame is formed that is rectangular or square in particular.

According to an embodiment of the present invention, in such a configuration having four coils and associated components (magnetic flux return and guiding structures), the first magnetic flux return structure is arranged at a first height with respect to the support, and the second magnetic flux return structure is arranged at a different second height with respect to the support. Further, the third magnetic flux return structure is arranged at the first height, and the fourth magnetic flux return structure is arranged at the second height.

This allows the carrier to be attracted on both sides into a tilted position by reluctance forces, by configuring the control unit to cause the electric energy source to apply a first current to said first coil and at the same time a second current to said second coil so that two reluctance forces are generated that reduce the first and the fourth gap at the same time and tilt the carrier about the first axis into its second position. Likewise, the control unit is preferably further configured to cause the electric energy source to apply a third current to said third coil and at the same time a fourth current to said fourth coil so that two reluctance forces are generated that reduce the third and the fourth gap at the same time and tilt the carrier about a second axis from a third position into a fourth position. Here, the respective initial (first and third positions) are rest positions when no current is applied. Particularly, the control unit is configured to cause the electrical energy source to apply these currents such that the carrier can be tilted back and forth between the first and second position about the first axis and between the third and fourth position about the second axis. Since the tilting can be performed about both axes independently, the carrier can be tilted in 2D.

Particularly, in the present embodiment, the support is formed as a rectangular, particularly square, frame member, wherein the two bars by means of which the carrier is elastically coupled to the frame extend along a diagonal of the frame member, each connecting the first frame member of the carrier, which first frame member holds the transparent plate member, to a corner region of the support frame.

According to an alternative embodiment of the present invention that allows tilting of the transparent plate member in 2D that also features four coils that face each other in a pairwise fashion as described above, the carrier comprises a further circumferential second frame member that is elastically coupled to the first frame member, particularly via two second bars, such that the first frame member can be tilted between a third and a fourth position about a second axis with respect to the first frame member, and wherein the first frame member is elastically coupled to the support, particularly via the two first bars, so that the first frame member (together with the second frame member) can be tilted about the first axis between the first and the second position, and wherein the third magnetic flux guiding structure is connected to a first section of the second frame member, which first section faces a second section of the second frame member to which second section the fourth magnetic flux guiding structure is connected.

It is to be noted in this context, that in case only one (first) frame member is present, the latter rigidly holds the transparent plate member and is preferably coupled directly to the support in an elastic manner (e.g. by means of the first bars). In case also a second frame member is present, the transparent plate member is preferably rigidly coupled to the second frame member. Here, the transparent plate member can still be regarded as being connected to the first frame member, but now elastically via the second frame member (or second bars).

Further, it is possible to let all reluctance forces act on the second frame member. Then, the first magnetic flux guiding structure is connected to a third section of the second frame member, which third section faces a fourth section of the second frame member to which fourth section the fourth magnetic flux guiding structure is connected.

Also in this embodiment and its variants the control unit is particularly configured to cause the electric energy source to apply a first current to said first coil and a second current to said second coil such that when the first current is applied to the first coil, magnetic flux generated by the first coil is guided by the first magnetic flux return structure and the first magnetic flux guiding structure via said first gap resulting in a reluctance force that tilts the first frame member (together with the second frame member) about the first axis into the first position so as to reduce said first gap, and such that when the second current is applied to the second coil, magnetic flux generated by the second coil is guided by the second magnetic flux return structure and the second magnetic flux guiding structure via said second gap resulting in a reluctance force that tilts the first frame member (together with the second frame member) about the first axis into the second position so as to reduce said second gap, wherein particularly the control unit is further configured to cause the electric energy source to apply the first current and the second current such that the first frame member (together with the second frame member) is tilted back and forth between the first and the second position according to a predefined pattern.

Furthermore, particularly, the control unit is also configured to cause the electric energy source to apply a third current to said third coil and a fourth current to said fourth coil such that when the third current is applied to the third coil, magnetic flux generated by the third coil is guided by the third magnetic flux return structure and the third magnetic flux guiding structure via said third gap resulting in a reluctance force that tilts the second frame member with respect to the first frame member about a second axis into the third position so as to reduce said third gap, and such that when the fourth current is applied to the fourth coil, magnetic flux generated by the fourth coil is guided by the fourth magnetic flux return structure and the fourth magnetic flux guiding structure via said fourth gap resulting in a reluctance force that tilts the second frame member with respect to the first frame member about the second axis into the fourth position so as to reduce said fourth gap, wherein particularly the control unit is configured to cause the electric energy source to apply the third current and the fourth current such that the second frame member is tilted back and forth with respect to the first frame member between the third and the fourth position according to a predefined pattern.

Since the transparent plate member can be tilted in this manner about the two axes independently, a 2D tilting of the plate member is possible.

Further, according to an embodiment of the optical device according to the invention, the further carrier stated above is formed as a circumferential second frame member to which said transparent further plate member is rigidly mounted, wherein said second frame member is elastically coupled via at least a second bar, particularly two second bars, which are preferably aligned with respect to each other, to said support.

Further, according to an embodiment, the optical device is configured to guide magnetic flux generated by the actuator means via said bars, and particularly also via said carriers (e.g. first and second frame members) and said support.

Further, according to an embodiment of the optical device according to the invention, the further reluctance actuator means stated above comprises a third electrically conducting coil mounted on a third magnetic flux return structure that is connected to the support, and a third magnetic flux guiding structure formed by the second frame member, wherein said third magnetic flux guiding structure is separated from said third magnetic flux return structure by a third gap, and wherein the further reluctance actuator means comprises a fourth electrically conducting coil mounted on a fourth magnetic flux return structure that is connected to the support, and a fourth magnetic flux guiding structure formed by the second frame member, wherein said fourth magnetic flux guiding structure is separated from said fourth magnetic flux return structure by a fourth gap.

Further, according to an embodiment of the optical device according to the invention, the support, the first frame member, and the second frame member are formed by at least a top layer and a bottom layer, which layers are preferably formed out of a metal, respectively, and which are arranged on top of each other. Particularly these layers are formed as plates comprising recesses.

Further, according to an embodiment of the optical device according to the invention, the bottom layer comprises a contour/shape that is identical to the contour/shape the top layer, but the bottom layer is attached to the top layer such that it is rotated with respect to the top layer by 180° about a central axis lying in the extension plane of the bottom layer.

Further, according to an embodiment of the optical device according to the invention, the top layer comprises an outer frame member (forming part of the support) that is integrally connected to the first frame member via said first bars, wherein the outer frame member surrounds the first frame member, and/or that the bottom layer comprises an outer frame member (forming again part of the support) that is integrally connected to the second frame member via said second bars, wherein the outer frame member surrounds the second frame member. Particularly, the outer frame members of said layers may comprise (e.g. two) discontinuities (i.e. gaps) for magnetic flux guiding/blocking purposes.

According to a further embodiment, the top and the bottom layer are connected by first fastening means (e.g. screws) that are designed to guide magnetic flux from the top layer to the bottom layer or vice versa.

Further, according to an embodiment, the top and the bottom layer are connected by second fastening means (e.g. screws) that are designed to block or suppress the passage of magnetic flux from the top layer to the bottom layer or vice versa.

Further, according to an embodiment of the optical device according to the invention, the top layer comprises two portions protruding inwards from the outer frame member of the top layer, which portions form the third and fourth magnetic flux return structure, and/or in that the bottom layer comprises two portions protruding inwards from the outer frame member of the bottom layer, which portions form the first and second magnetic flux return structure.

Further, due to this configuration of the top and bottom layer, the return structures are offset from the opposing region of the associated guiding structure in direction normal to the extension plane of the first and second frame member, so that a tilting movement can be achieved by the reluctance actuator(s).

Further, according to an embodiment of the optical device according to the invention, the support comprises a further circumferential layer, which is particularly arranged between the top and the bottom layer: This further layer may be formed out of a metal or plastic. The further layer may comprise electrical contacts for the coils and may form a printed circuit board (PCB).

Further, according to an embodiment of the optical device according to the invention, the further circumferential layer is configured to block or suppress passage of magnetic flux from the top layer to the bottom layer or vice versa.

Further, according to an embodiment of the optical device according to the invention, the further circumferential layer comprises a circumferential frame member and portions protruding inwards from said circumferential frame member, which portions form stops for the first and second frame member that hold said transparent plate members. However, such stops can also be absent. It is to be noted, that the further circumferential layer can also be arranged on top or below the two other (top and bottom) layers.

Further, according to an embodiment of the optical device according to the invention, the top and the bottom layer are arranged on top of one another without an intermediary layer in between the top and the bottom layer, wherein one or several regions of the first and/or second frame member are etched (or otherwise removed) so as to provide a clearance between the first and the second frame member that allows said frame members to tilt about the respective axis and/or to block/suppress passage of magnetic flux.

Further, according to an embodiment of the optical device according to the invention, said carrier comprises an inner and an outer frame member, wherein the (single) plate member is rigidly mounted to the inner frame member, and wherein the outer frame member is elastically coupled to a circumferential support frame via first bars so that the carrier can be tilted about said first axis between said first and said second position, and wherein the inner frame member is elastically coupled to the outer frame member via second bars, so that it can be tilted together with the plate member about a second axis between a third and a fourth position with respect to the outer frame member, whereby particularly said projected image is shifted by a fraction of a pixel along a second direction.

Further, according to an embodiment of the optical device according to the invention, the actuator means is an electromagnetic actuator that is designed to exert a Lorentz force on the inner and/or outer frame member to tilt the plate member about the first and/or second axis as described herein.

Further, according to an embodiment of the optical device according to the invention, this actuator means is configured to generate a magnetic field as well as an electrical current for tilting the outer frame member about the first axis such that the magnetic field located plumb-vertical above said current with respect to a direction normal to an extension plane of the outer frame member runs parallel to said extension plane of the outer frame member (and e.g. orthogonal to the current). Likewise, the actuator means may be configured to generate a magnetic field as well as an electrical current for tilting the inner frame member about the second axis such that the magnetic field located plumb-vertical above said current with respect to a direction normal to an extension plane of the inner frame member runs parallel to said extension plane of the inner frame member (and e.g. orthogonal to the current).

Further, according to an embodiment of the optical device according to the invention, the actuator means comprises an inner and an outer coil connected to the support frame for generating said currents, which coils extend circumferentially along the inner and outer frame member, wherein a first and an opposing second magnet of the actuator means are arranged on the outer frame member such that they are arranged above the outer coil, and wherein a third and an opposing fourth magnet of the actuator means are arranged on the inner frame member, such that they are arranged above the inner coil.

Further, according to an embodiment of the optical device according to the invention, particularly in conjunction with an inner and a surrounding outer coil, each magnet is arranged adjacent a magnetic flux return structure having an L-shaped cross section.

Particularly, an air gap may be provided between each magnet and its magnetic flux return structure, particularly in a direction parallel to an extension plane of the support frame.

Further, according to an embodiment of the optical device according to the invention, for generating said currents the optical device comprises a first and an opposing second coil which are connected to the support frame, as well as a third and an opposing fourth coil which are connected to the support frame, too, wherein the optical device further comprises a first magnet that is associated to the first coil and arranged on the outer frame member, as well as an opposing second magnet that is associated to the second coil and arranged on the outer frame member, and wherein the optical device further comprises a third magnet that is associated to the third coil and arranged on the inner frame, as well as an opposing fourth magnet that is associated to the fourth coil and arranged on the inner frame member, and wherein each magnet is arranged above two parallel sections of its associated coil in a centered fashion.

Further, according to an embodiment of the optical device according to the invention, each magnet is embedded into a magnetic flux return structure having a U-shaped cross section.

Particularly, an air gap may be provided on both sides of each magnet between the respective magnet and its magnetic flux return structure.

Further, according to an embodiment of the optical device according to the invention, the optical device comprises an electric energy source and a control unit (see also above) configured to cause the electric energy source to apply a current to at least one of the electrically conducting coils.

Further, according to an embodiment of the optical device according to the invention, the optical device is configured to measure the position (e.g. tilt angle) of the inner and/or outer frame member, or of the plate member, using one of: an Inductive position measurement, particularly using at least one of said coils or an additional coil, a capacitive position measurement, or a Hall sensor.

Further, preferably, the control unit is configured to control said energy source depending on said position of the inner and/or outer frame member, or depending on the position of the transparent plate member.

In the following, further advantages and features of the present invention as well as embodiments of the present invention are described with reference to the Figures, wherein:

FIG. 1 shows an embodiment of an optical device according to the present invention that allows for shifting an image by a fraction of a pixel in one direction (1D);

FIG. 2 schematically shows different views of the individual components of an optical device of the kind shown in FIG. 1;

Figure 31:
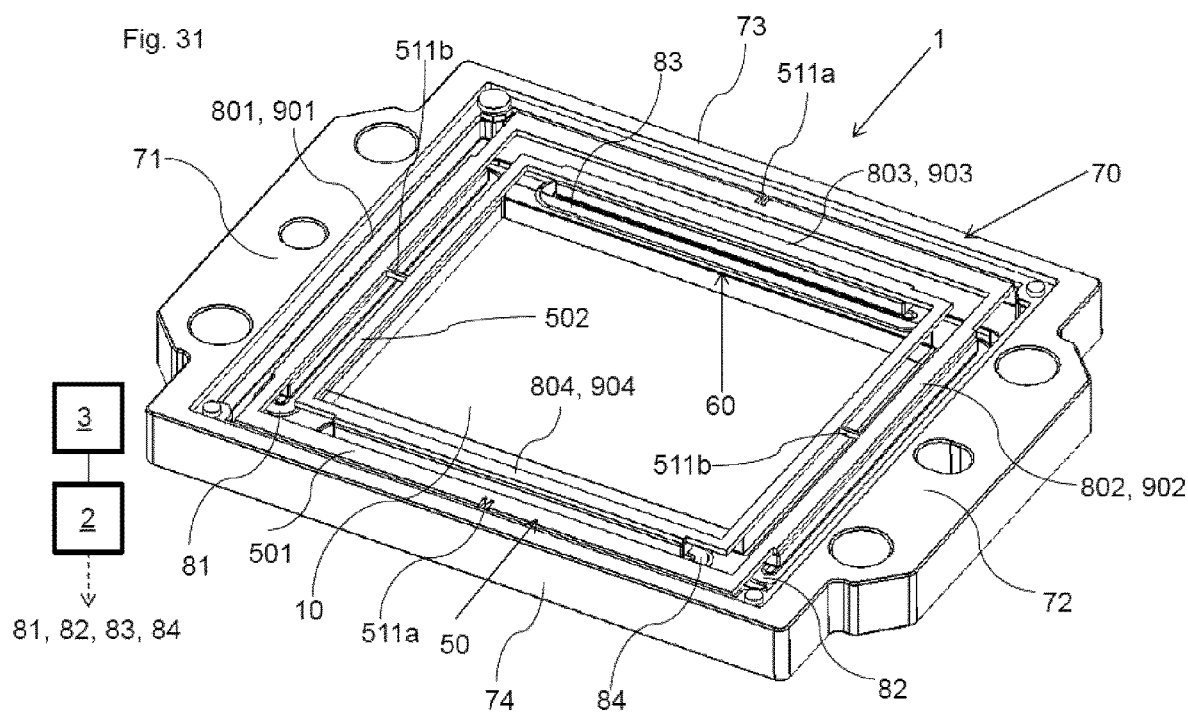
FIG. 31 shows a modification of the embodiment shown in FIGS. 29 and 30, wherein here four coils and associated magnets are used for tilting the inner and outer frame member.
Figure 32:
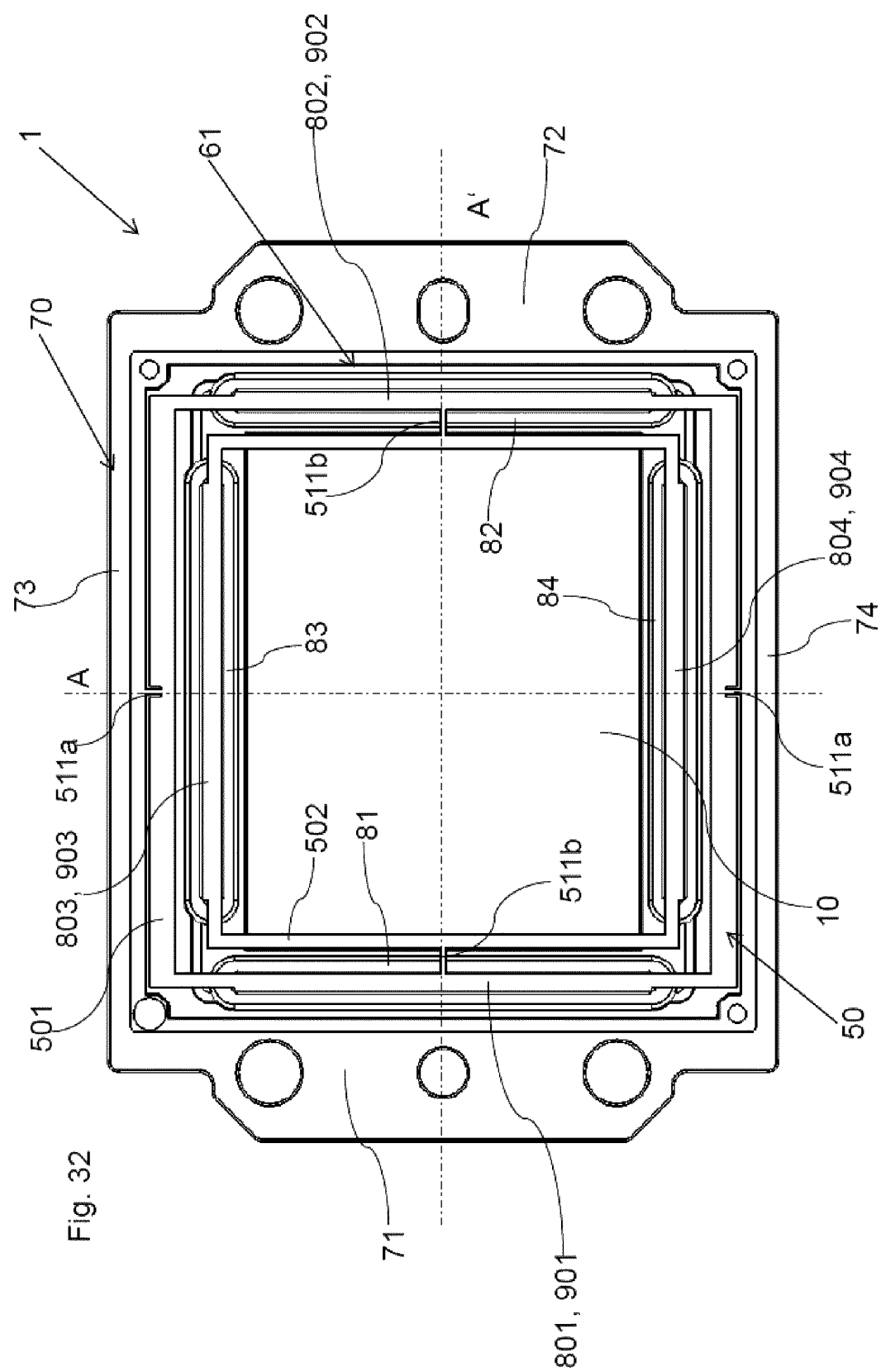
FIG. 32 shows a plan view of the embodiment shown in FIG. 31.
Figure 34:
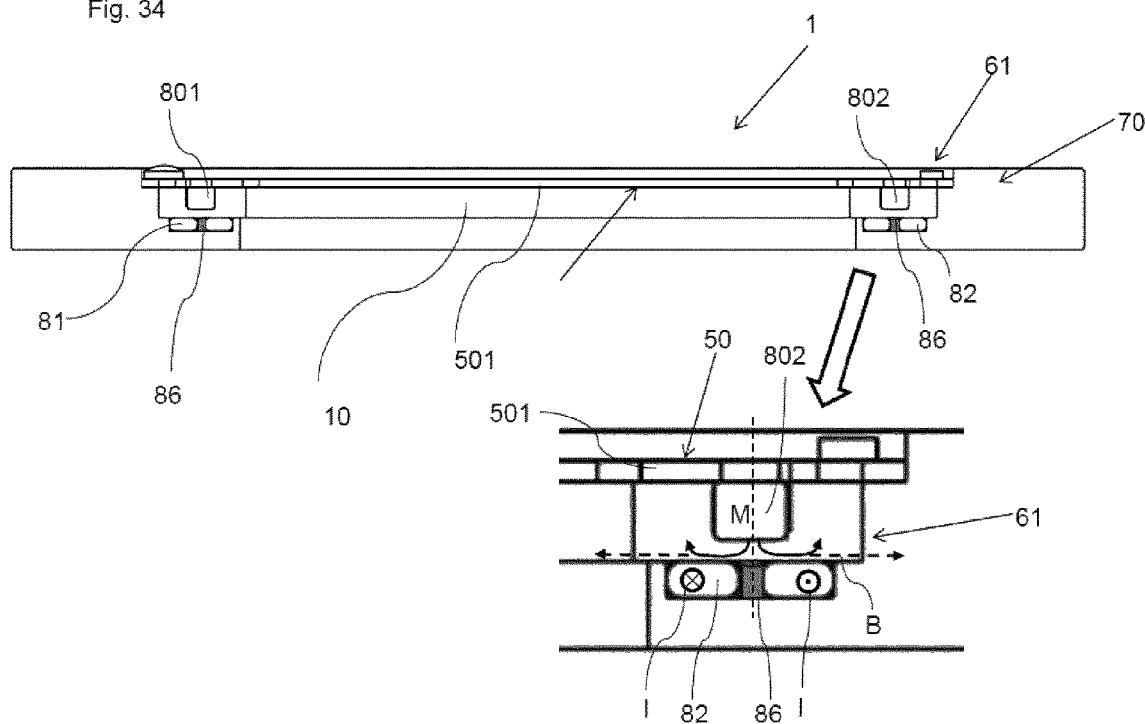
Figure 35:
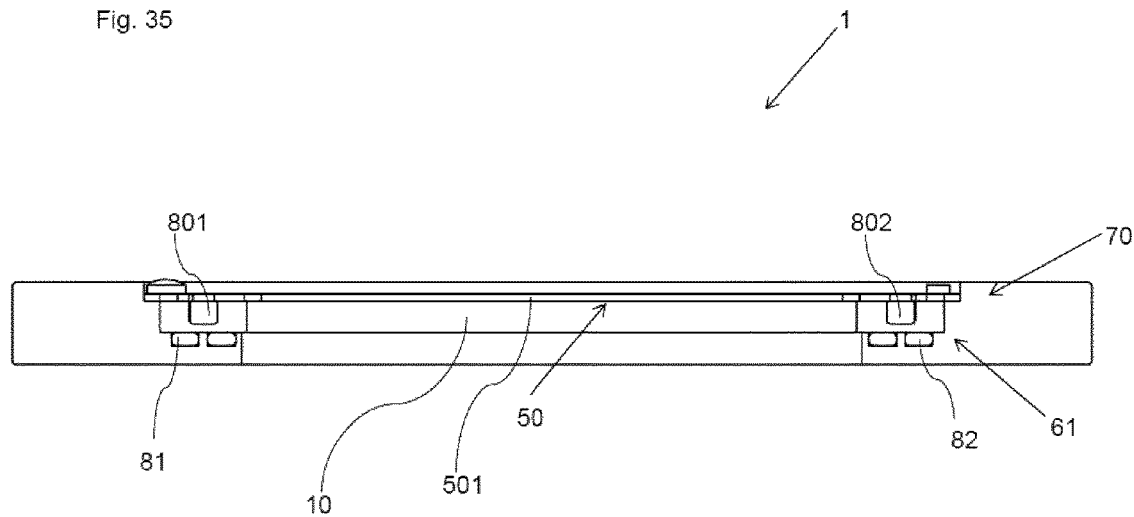
Figure 36:
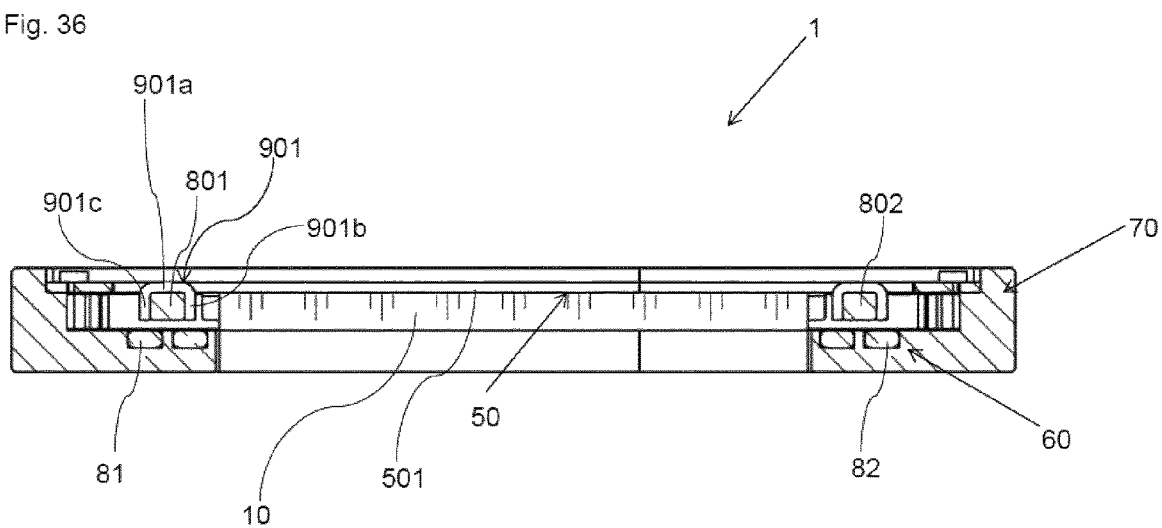

FIG. 34 shows a cross sectional view of a version of the embodiment of FIGS. 31 and 32, wherein the coils comprise a metal core; and FIG. 35 shows a cross sectional view of a version of the embodiment of FIGS. 31 and 32, with coils having no metal core; and FIG. 36 shows a cross sectional view of a version of the embodiment of FIGS. 31 and 32, with magnets comprising a U-shaped magnetic flux return structure.

The present invention relates to optical devices that allow to shift an image projected by a light beam by a fraction of a pixel (e.g. one-half pixel) in either 1D (e.g. horizontally) along a first direction x (e.g. corresponding to pixel rows of the image) or 2D (e.g. horizontally and vertically) along a first direction x and a second direction y (e.g. corresponding to pixel columns of the image).

Figure 1:
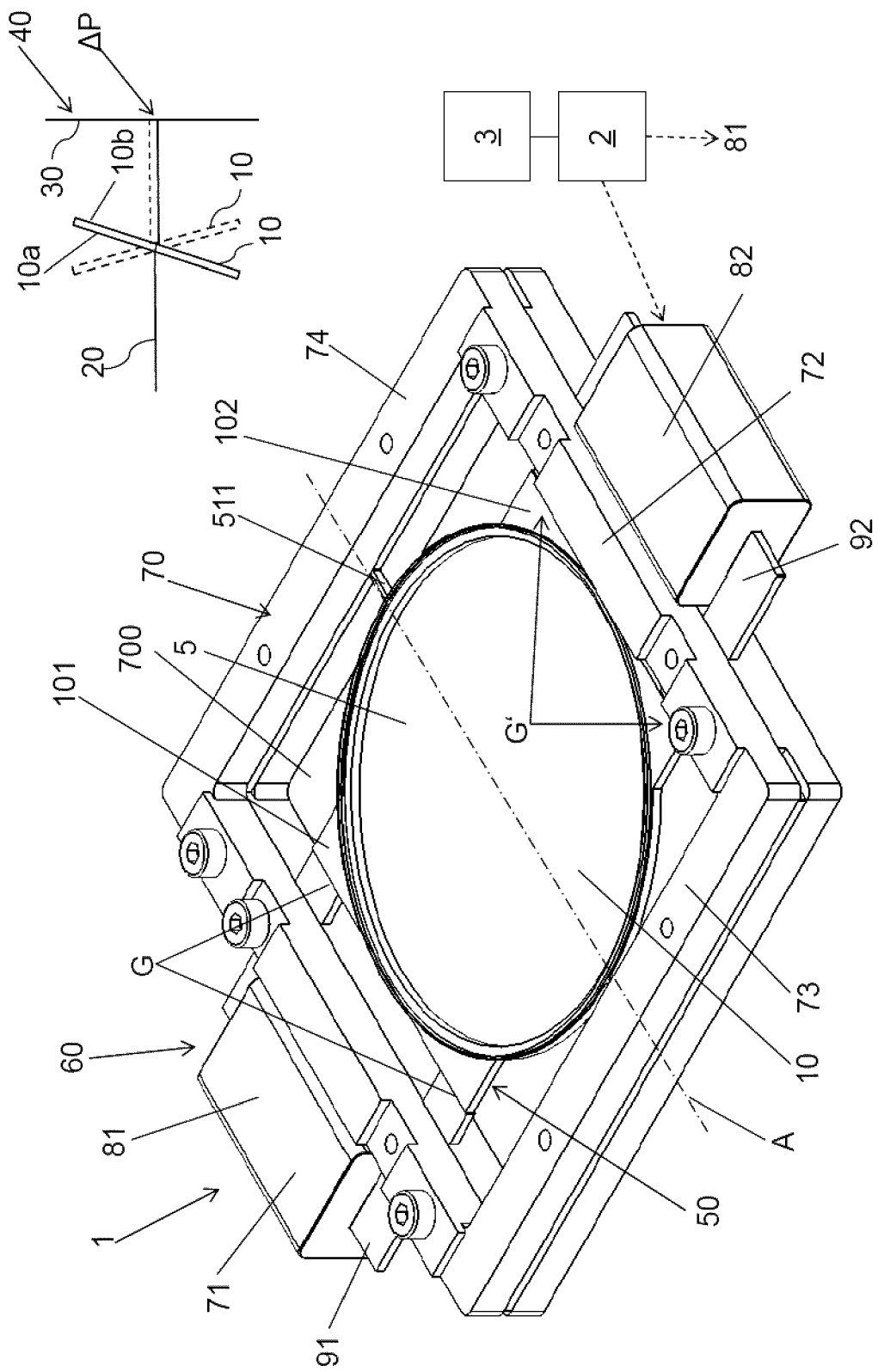

FIG. 1 shows an embodiment of an optical device according to the invention that allows to tilt a transparent member 10 in 1D between a first and a second position such that a light beam passing through the plate member is shifted by a fraction of a pixel (see also above).

Here, the plate member 10 comprises two parallel, flat surfaces 10a, 10b that face away from each other and extend along the extension plane of the plate member 10. Thus, a light beam passing the plate member 10 gets refracted at each surface 10a, 10b and finally the incident light beam 20 runs parallel to the transmitted light beam 20. Particularly the first and second position, i.e., the tilting angle, is selected such that the shift ΔP of the light beam 20 corresponds to a fraction (e.g. one-half) of a pixel of the image 30.

In detail, the optical device 1 according to FIG. 1 comprises said transparent plate member 10 configured for refracting said light beam 20 passing through the plate member 10, which light beam 20 projects an image 30 comprised of rows and columns of pixels 40, a carrier 50 formed as a circumferential (e.g. circular) first frame member to which said (particularly circular) transparent plate member 10 is rigidly mounted, wherein the carrier 50 is configured to be tilted back and forth between a first and a second position about a first axis A that is defined by two first bars 511 that connect the carrier 50, to which the plate member 10 is attached, to a circumferential (e.g. rectangular or square) support 70 which surrounds the carrier 50 and plate member 10. The support 70 or at least parts thereof can be made out of steel or another suitable material (this holds for all embodiments). The carrier 50 defines an aperture 5 through which the light beam 20 can pass so as to pass the plate member 10. The first bars 511 are aligned with each other and coincide with the first axis A about which the first carrier 50/plate member 10 can be tilted between a first and a second position. Particularly said axis A extends parallel to the plate member 10.

The support 70 is formed as a support frame 70 that also defines a central aperture 700 in which the carrier 50 and plate member 10 are arranged.

The support 70 comprises four regions 71, 72, 73, 74 in the form of legs 71, 72, 73, 74 which are each connected with their ends to a neighboring leg such that a rectangular or square support frame is formed. Particularly, the support frame 70 comprises a first leg 71 that extends parallel to the first axis A as well as to a second leg 72 which faces the first leg 71 in a direction that runs perpendicular to the first axis A. The first and the second leg 71, 72 are connected by a third leg 73 and a fourth leg 74, wherein the third leg 73 and the fourth leg 74 also extend parallel to each other and face each other in the direction of the axis A/first bars 511.

Particularly, one first bar 511 elastically couples the carrier 50 to the third leg 73, while the other first bar 511 elastically couples the carrier 50 to the fourth leg 74 of the support frame 70 as will be described in more detail below.

Now, for tilting the carrier 50 and the plate member 10 connected thereto, the optical device 1 comprises a reluctance actuator means 60, which comprises a first electrically conducting coil 81 mounted on a first magnetic flux return structure 91 that is connected to the support 70, namely to the first leg 71, as well as a first magnetic flux guiding structure 101 connected (e.g. integrally) to the carrier 50. Further, the reluctance actuator means 60 comprises a second electrically conducting coil 82 mounted on a second magnetic flux return structure 92 that is connected to the support 70, namely to the second leg 72, and a second magnetic flux guiding structure 102 connected (e.g. integrally) to the carrier 50.

Particularly, the first magnetic flux guiding structure 101 is (e.g. integrally) connected to a first section of the circumferential carrier 50, while the second magnetic flux guiding structure 102 is (e.g. integrally) connected to an opposing second section of the circumferential carrier 50.

The carrier 50 is now arranged such in said aperture 700 of the support 70 that it is positioned between the two magnetic flux return structures 91, 92, wherein said first magnetic flux guiding structure 101 is separated from said first magnetic flux return structure 91 by a first gap G, and wherein said second magnetic flux guiding structure 102 is separated from said second magnetic flux return structure 92 by a second gap G'. Particularly, the widths of the first and the second gap G, G' when the plate member 10 is not tilted but extends parallel to the extension plane of the support frame 70 may lie within the range from 15 μm to 1000 μm, respectively.

The carrier 50 is further arranged such with respect to the magnet flux guiding structures 91, 92 that the first or second gap G, G' can be reduced by tilting the carrier 50 correspondingly.

Further, the carrier or first frame member 50 is elastically coupled via said first bars 511 to said support 70 so that a restoring force is generated when the carrier 50 moved out of a rest position in which an extension plane of the plate member 10 extends parallel to the extension plane of the support frame 70 into a tilted first or second position where the plate member 10 comprises a tilt with respect to the support frame 70. The respective restoring force tries to pivot the carrier 50 and plate member 10 back into said rest position.

For tilting the carrier 50 and thus the plate member 10 into the first or second (tilted) position, the optical device 1 comprises an electric energy source 2 and a control unit 3 that is configured to cause the electric energy source 2 to apply currents to the electrically conducting coils 81, 82. For simplicity, the control unit 3 and electric energy source 2 is merely indicated in FIG. 1, but are also present in the other embodiments where these components 2, 3 also apply currents to the coils in order to tilt the respective plate member 10.

Particularly, the control unit 3 is configured to apply a first current to said first coil 81 and a second current to said second coil 82 such that when the first current is applied to the first coil 81, magnetic flux generated by the first coil 81 is guided by the first magnetic flux return structure 91 and the first magnetic flux guiding structure 101 via said first gap G resulting in a reluctance force that tilts the carrier 50 into the first position so as to reduce said first gap G, and such that when the second current is applied to the second coil 82, magnetic flux generated by the second coil 82 is guided by the second magnetic flux return structure 92 and the second magnetic flux guiding structure 102 via said second gap G' resulting in a reluctance force that tilts the carrier 50 into the second position so as to reduce said second gap G', wherein particularly the control unit 3 is configured to cause the electric energy source 2 to apply the first current and the second current such that the carrier 50 is tilted back and forth between the first and the second position according to a predefined pattern.

Further, as indicated in FIG. 1, the coils 81, 82 are arranged outside the support frame 70, wherein the magnetic flux return structures 91, 92 on which the coils 81, 82 are mounted, are formed as u-shaped plate members, wherein each u-shaped plate member has two free ends forming a face side 91b, 91b of the respective magnetic flux return structure 91, 92, wherein these free ends protrude into said aperture 700 of the support 70. Particularly, in the context of the present invention, a u-shaped plate member is a plate member that comprises a base section having two ends, wherein an end section protrudes from each end of the base section, and wherein said end sections protrude along the same direction from the base section and run perpendicular to the base section.

Figure 2:
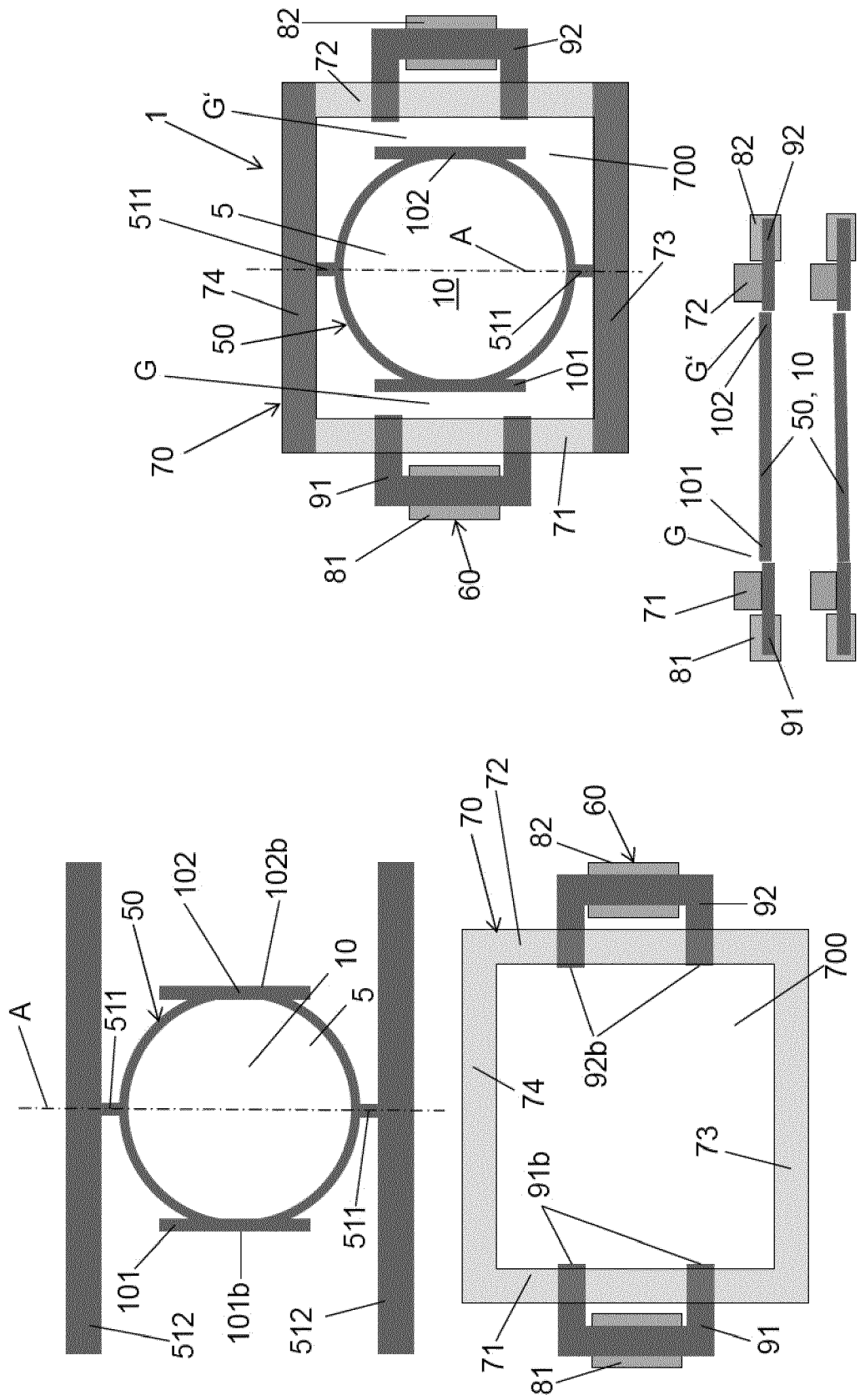

In detail, the free ends (or face side 91b) of the first magnetic flux return structure 91 define the first gap G together with a face side 101b of the first magnetic flux guiding structure 101, whereas the free ends (or face side 92b) of the second magnetic flux return structure 92 define the second gap G' together with a face side 102b of the second magnetic flux guiding structure 102 (cf. also FIG. 2).

Preferably, the carrier (first frame member) 50, the first bars 511, the magnetic field guiding structures 101, 102 and said arms 512 are formed integrally in one piece. Particularly, these components 50, 511, 101, 102, 512 particularly form an integral flat plate member that is particularly formed out of a magnetically soft material as described above.

Particularly, as an example, the dimensions of the optical device 1 according to FIG. 1 (or FIG. 2) can be as follows. Said integral flat plate member 50, 511, 101, 102, 512 or the components 50, 511, 101, 102, 512 may have a thickness of 0.8 mm. The first bars 511 may have a breadth in the range from 0.4 mm to 1.6 mm, particularly a breadth of 0.4 mm, 0.8 mm, 1.2 mm or 1.6 mm. Further, also the thickness of the return and guiding structures 91, 91, 101, 102 can be 0.8 mm.

FIG. 2 shows different views of components as well as of an optical device 1 of the kind shown in FIG. 1

Here, each first bar 511 connecting the carrier (first frame member) 50 to the support 70 as described before (cf. FIG. 1) is integrally formed with an elongated arm 512 that is attached to the support frame 70, wherein one arm 512 is connected to the third leg 73 of the support 70 and the other arm 512 to the fourth leg 74 of the support frame 70. Particularly, the length and breadth of each arm 512 corresponds to the length and breadth of the third or fourth leg 73, 74 of the support frame 70.

Preferably, the carrier (first frame member) 50, the first bars 511, the magnetic field guiding structures 101, 102 and said arms 512 are formed integrally in one piece. Particularly, these components 50, 511, 101, 102, 512 particularly form an integral flat plate member that is particularly formed out of a magnetically soft material as described above.

Figure 3:
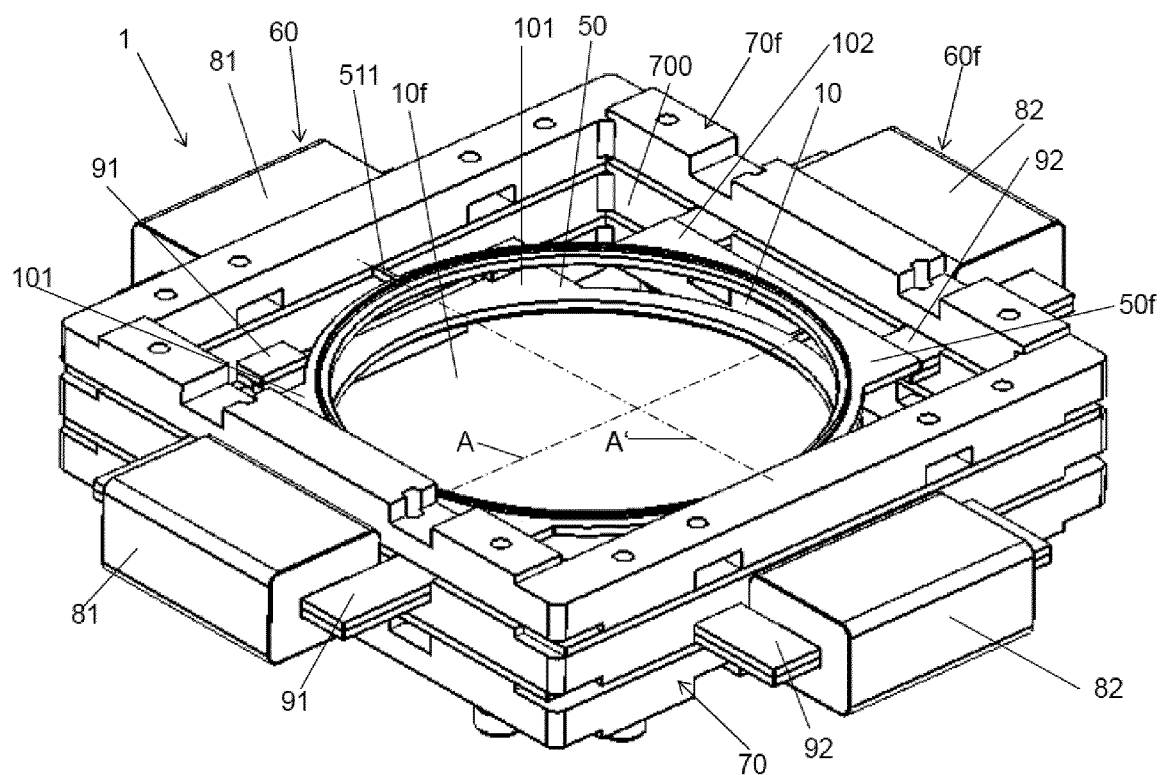
FIG. 3 shows an embodiment of an optical device according to the present invention that allows for shifting an image by a fraction of a pixel in two (orthogonal) directions (2D), wherein in this embodiment two assemblies of the kind shown in FIG. 1 are essentially stacked on top of each other.
Figure 4:
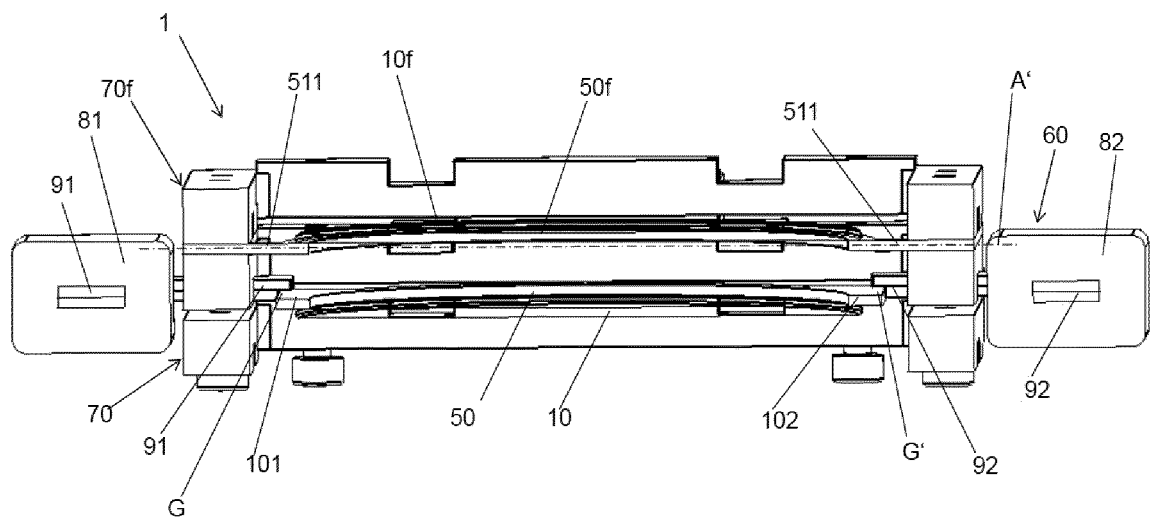
FIG. 4 shows a cross sectional view of the optical device shown in FIG. 3.

FIGS. 3 and 4 shown an embodiment of an optical device 1 according to the invention which allows to shift the light beam in 2D.

This is achieved by stacking two 1D optical devices 1 e.g. as described in FIGS. 1 and 2 on top of each other, but rotated by 90° with respect to each other (about a normal to the plate member 10). This combined optical device 1 now comprises a further transparent plate member 10f configured for refracting said light beam 20, which further transparent member 10f extends along the other plate member 10, as well as a further carrier 50f to which said further transparent plate member 10f is rigidly mounted, wherein the further carrier 50f is configured to be tilted back and forth between a third and a fourth position about a second axis A', such that the further plate member 10f is tilted back and forth between the third and the fourth position about the second axis A'.

The optical device 1 according to FIGS. 3 and 4 further comprises a further actuator means 60f that is configured to tilt the further carrier 50f and therewith the further plate member 10f between the third and the fourth position about the second axis A', wherein said further actuator means 60f is also formed as a reluctance actuator means (comprising coils 81, 82 as well) that is designed to exert a reluctance force on the further carrier 50f to tilt the further carrier 50f and therewith the further plate member 10f between the third and the fourth position about the second axis A' in the manner described above.

The second axis A' is oriented orthogonal to the first axis A due to the fact that the two individual 1D devices are rotated by 90° with respect to each other before connecting the (congruent) frame members 70, 70f. In this way, the optical device 1 allows to shift the image projected by the light beam 20 in 2D, i.e., along the x- and/or y-axis, by a fraction of a pixel (e.g. half a pixel), respectively.

Figure 5:
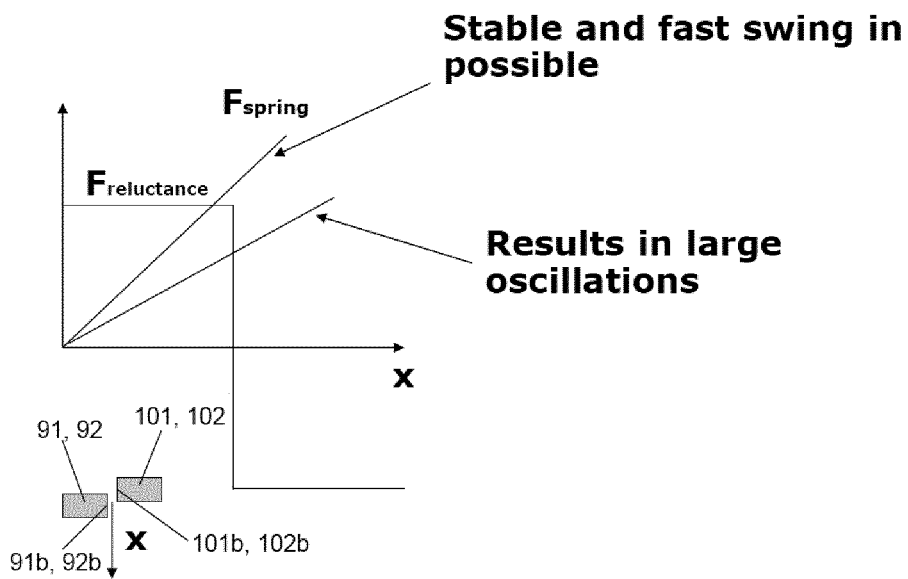
FIGS. 5 to 7 show graphical representations for different reluctance forces (linear and quadratic) generated by an actuator according to the invention compared to a linear restoring force provided by an elastic coupling between the carrier and the support of the device.
Figure 6:
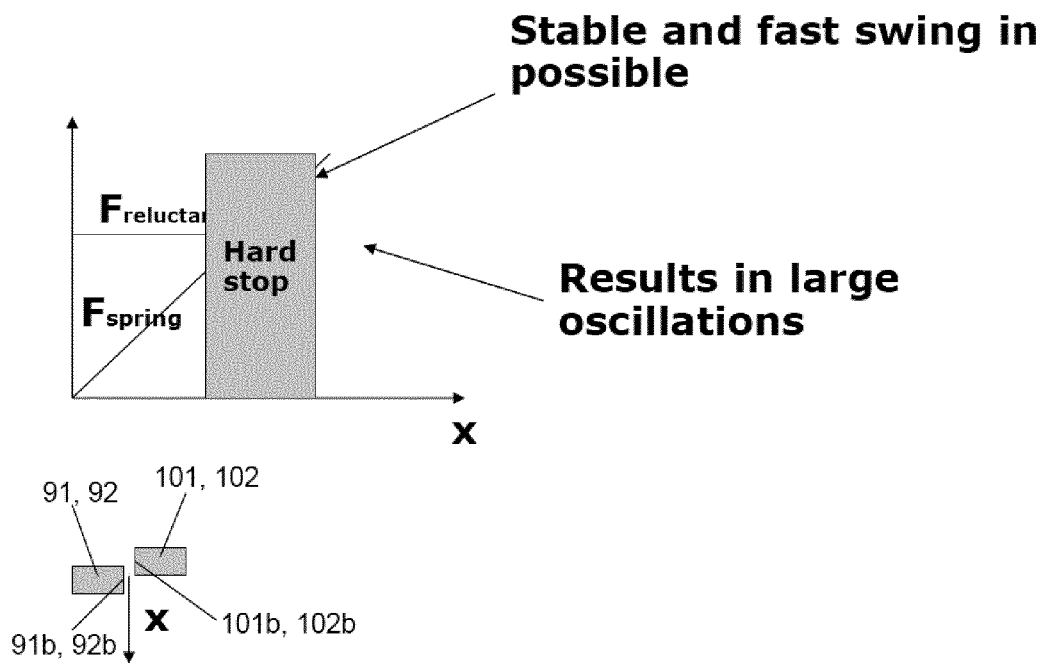
Figure 7:
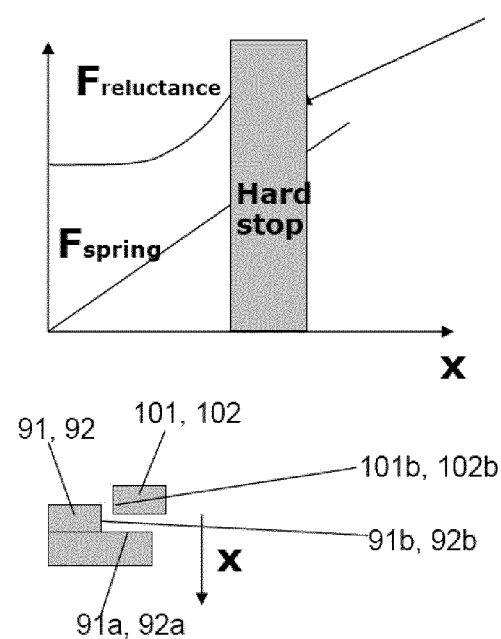

FIGS. 5 to 7 show graphical representations for different reluctance forces (linear and quadratic) generated by a reluctance actuator according to the invention compared to a linear restoring force provided by the elastic coupling between the carrier 50 and the support 70 of the optical device 1. In case the reluctance force is essentially linear as a function of the distance x between the respective magnetic flux return structure 91, 92 and the associated magnetic flux guiding structure 101, 102 a linear restoring force can be used for achieving a stable and fast swing in of the carrier 50. Further, as indicated in FIG. 6 a hard stop of the carrier 50 by means of a stopping means 111, 112 as described below with respect to FIG. 15 can be used in addition to avoid an overshooting of the carrier 50. However, in case a quadratic reluctance force is generated (e.g. by means of the arrangement shown in FIGS. 7, 15 and 16) a hard stop is preferably used in order to get a defined and stable tilted position of the carrier 50. As indicated in FIG. 5, an essentially linear reluctance force can be achieved, in case the respective gap G is delimited by a face side 91b of the respective magnetic flux return structure 91 and an essentially parallel face side 101b of the associated first magnetic flux guiding structure.

Further, as indicated in FIG. 7, an essentially quadratic reluctance force can be achieved, in case the respective gap G is further delimited by a horizontal surface area of the respective magnetic flux return structure 91a and a corresponding surface area of the associated magnetic flux guiding structure 101a. Fortunately, this situation can be used for establishing a hard stop, e.g., by letting the respective magnetic flux guiding structure 101 hit the surface area 91a of the associated return structure 91 particularly using an intermediary damping means.

Figure 8:
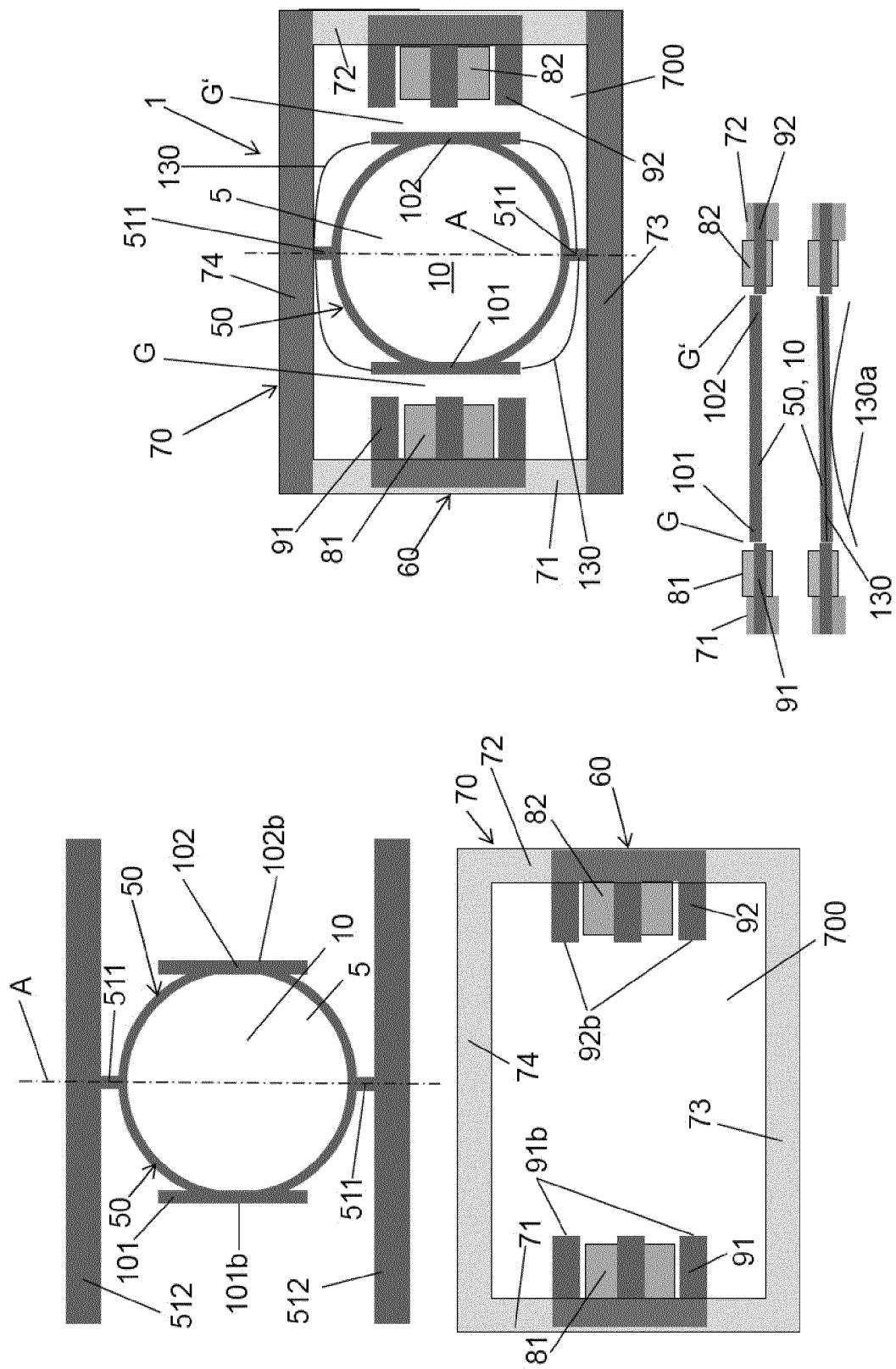
FIG. 8 shows a modification of the embodiment shown in FIG. 2, wherein a roll-off spring member is used for noise reduction upon tilting of the carrier and transparent plate member.

FIG. 8 shows a modification of the optical device according to FIG. 2. In contrast to FIG. 2 the first and the second coil 81, 82 is arranged in the aperture 700 formed by the support frame 70. For this, the first magnetic flux return structure 91 comprises an E-shape. Particularly, this means that the first magnetic flux return structure 91 comprises again a base section as well as three end sections protruding from the ends as well as from the center of the base section in the same direction (each end section runs perpendicular to the base section) namely into the aperture 700 of the support 70, wherein the middle end section holds the first coil 81 that is wound about said middle end section of the first magnetic flux return structure 91. The second magnetic flux return structure 92 is formed in the same way. Also here, the end sections of the second return structure 92 point into the aperture 700 and the second coil sits on the middle end section. Again, the first return structure is arranged on the first leg 71, while the second return structure 92 is arranged on the opposing second leg 72 of the support frame 70.

Further, the optical device 1 according to FIG. 8 comprises a (roll-off) spring member 130 connected to the carrier 50, which spring member 130 is configured to roll on a curved (roll-off) surface 130a (e.g. a convex surface 130a) that is connected to the support frame 70 when the carrier (50) is tilted into the first or into the second position.

Figure 9:
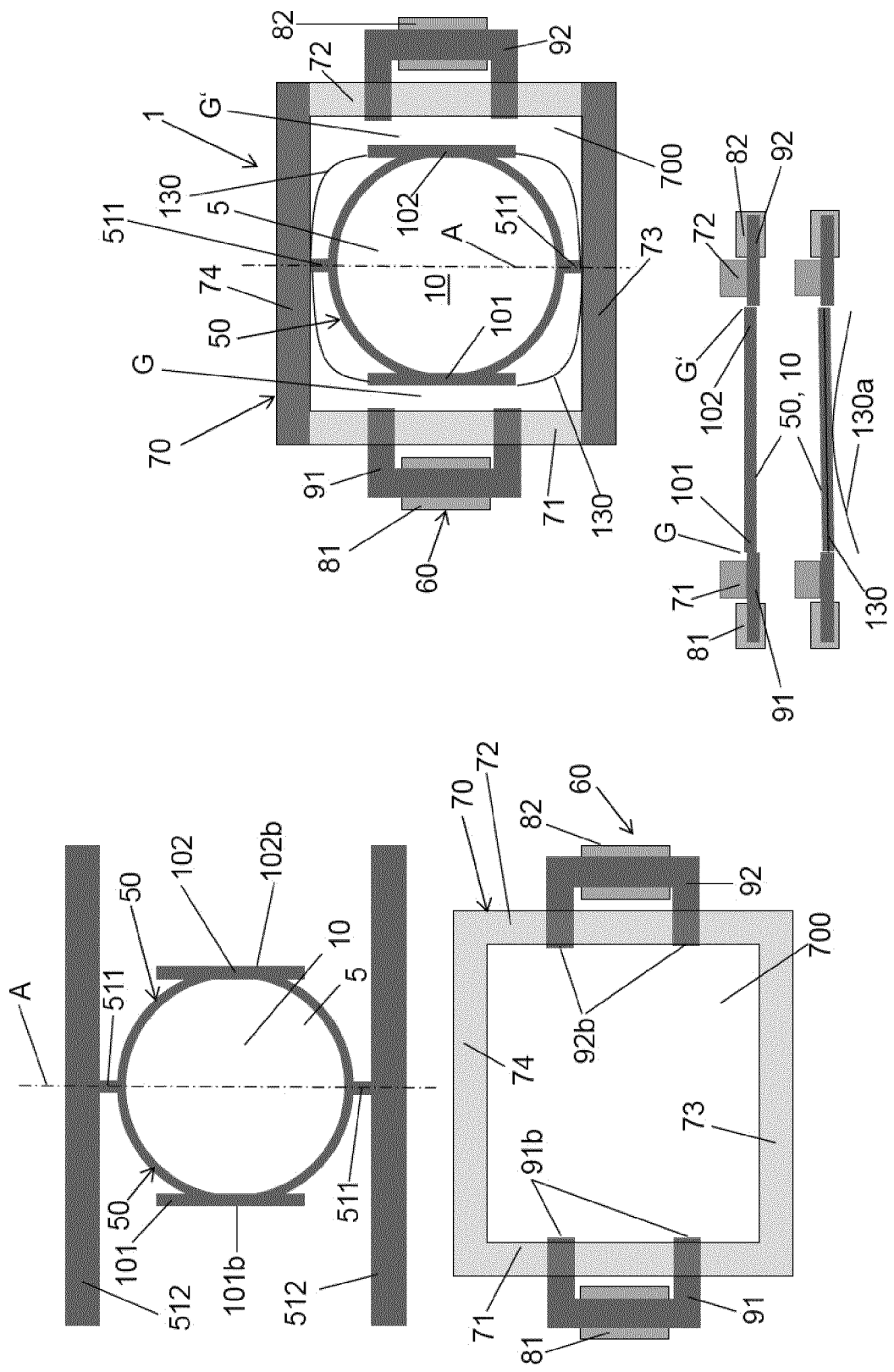
FIG. 9 shows a modification of the embodiment shown in FIG. 8.

Generally, such a spring member 130 can be used in all 1D embodiments of the optical device 1 according to the invention described herein in order to reduce noise upon tilting the carrier 50. FIG. 9 shows the application of the spring member 130 in the embodiment shown in FIG. 2.

Figure 10:
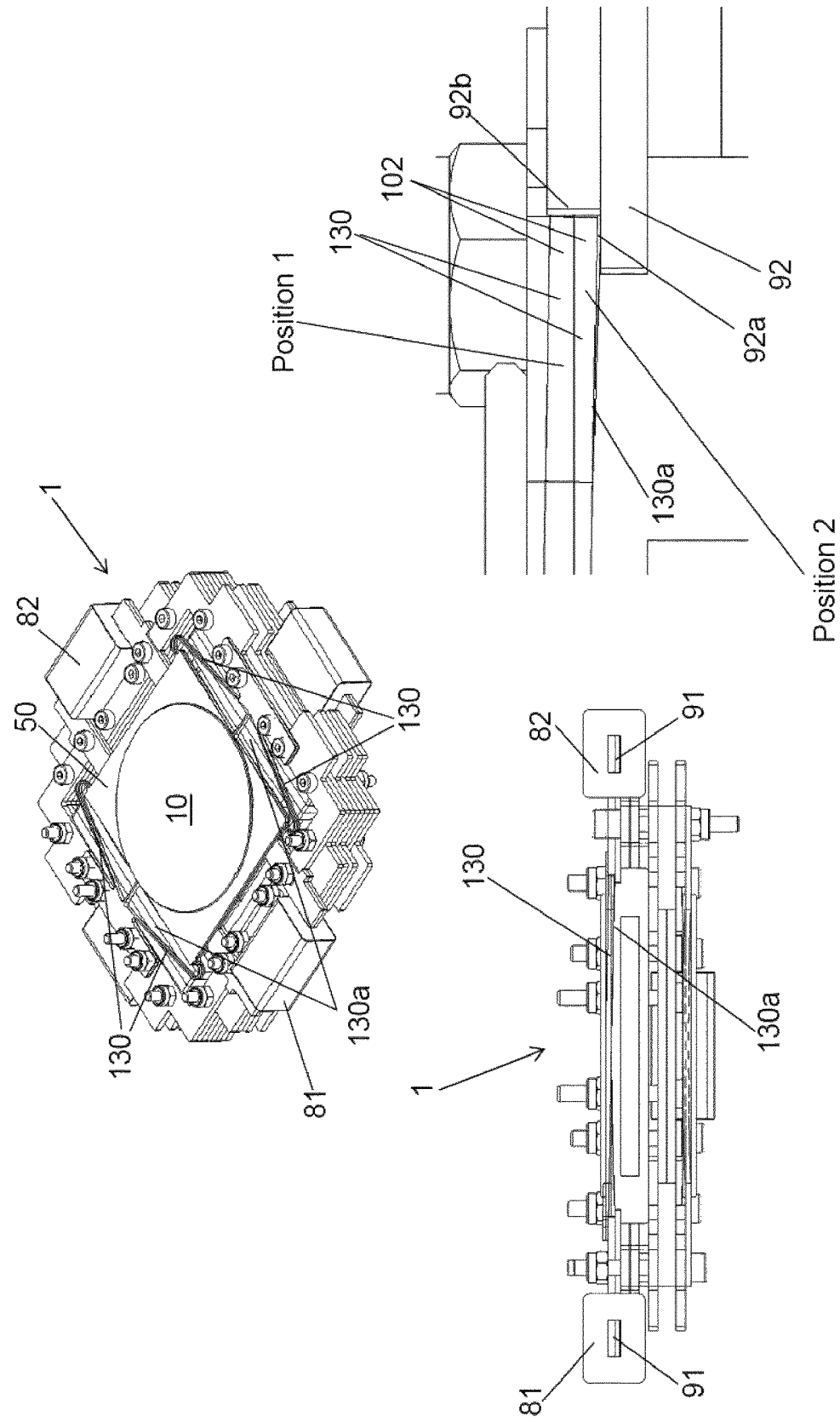
FIG. 10 shows a further embodiment of an optical device according to the invention using a roll-off spring member for noise reduction.

Further, FIG. 10 shows the roll-off spring member 130 in the context of the optical device 1 shown in FIGS. 3 and 4.

The detail in the lower right corner of FIG. 10 shows the spring member 130 rolling off the convex curved roll-off surface 130a into two different positions (Positions 1 and 2), wherein in the first position (Position 1) the carrier 50 has not yet contacted the horizontal surface area 92a of the second magnetic flux return structure 92. In the second position (Position 2), the carrier 50 contacts with its second magnetic flux guiding structure 102 said surface area 92a.

Figure 11:
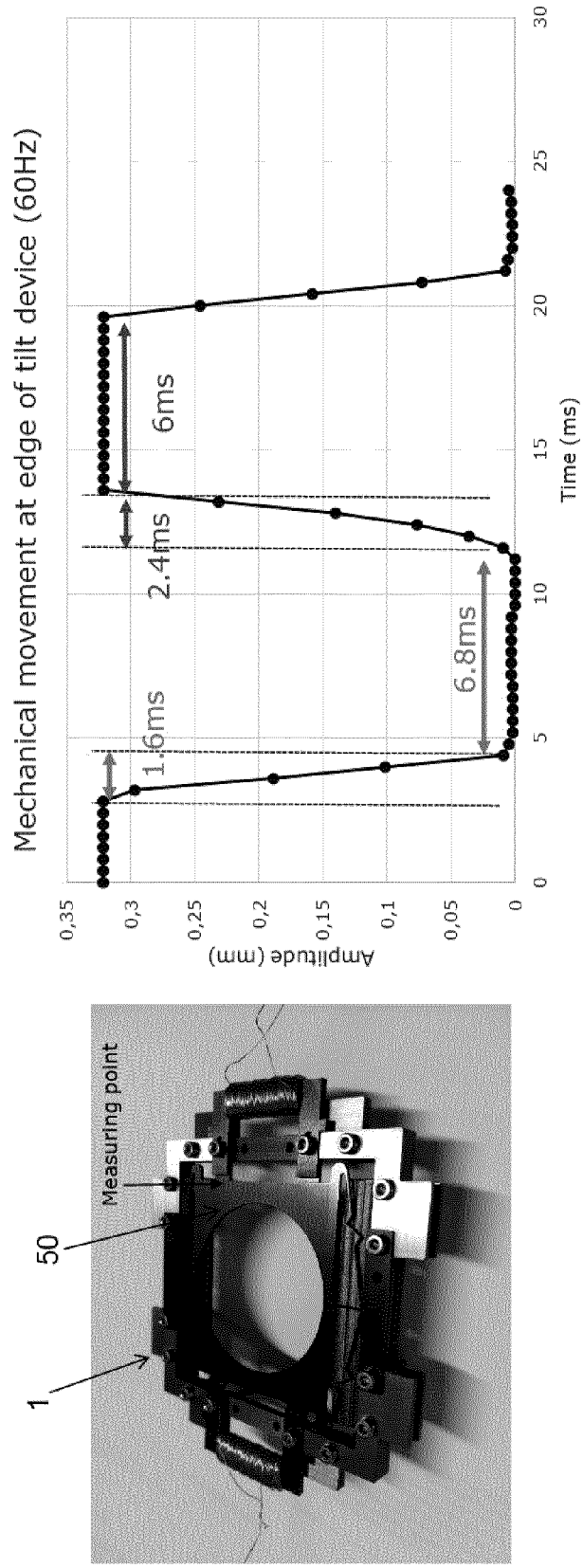
FIG. 11 shows a measurement of the tilting movement of the carrier versus time.

As an example, FIG. 11 shows the mechanical movement of the carrier 50 at its edge adjacent to the respective gap. The amplitude (in mm) of this movement is shown on the ordinate while the abscissa shows the time in ms. Using such a movement, a sub-pixel shift of an image can be realized.

Figure 12:
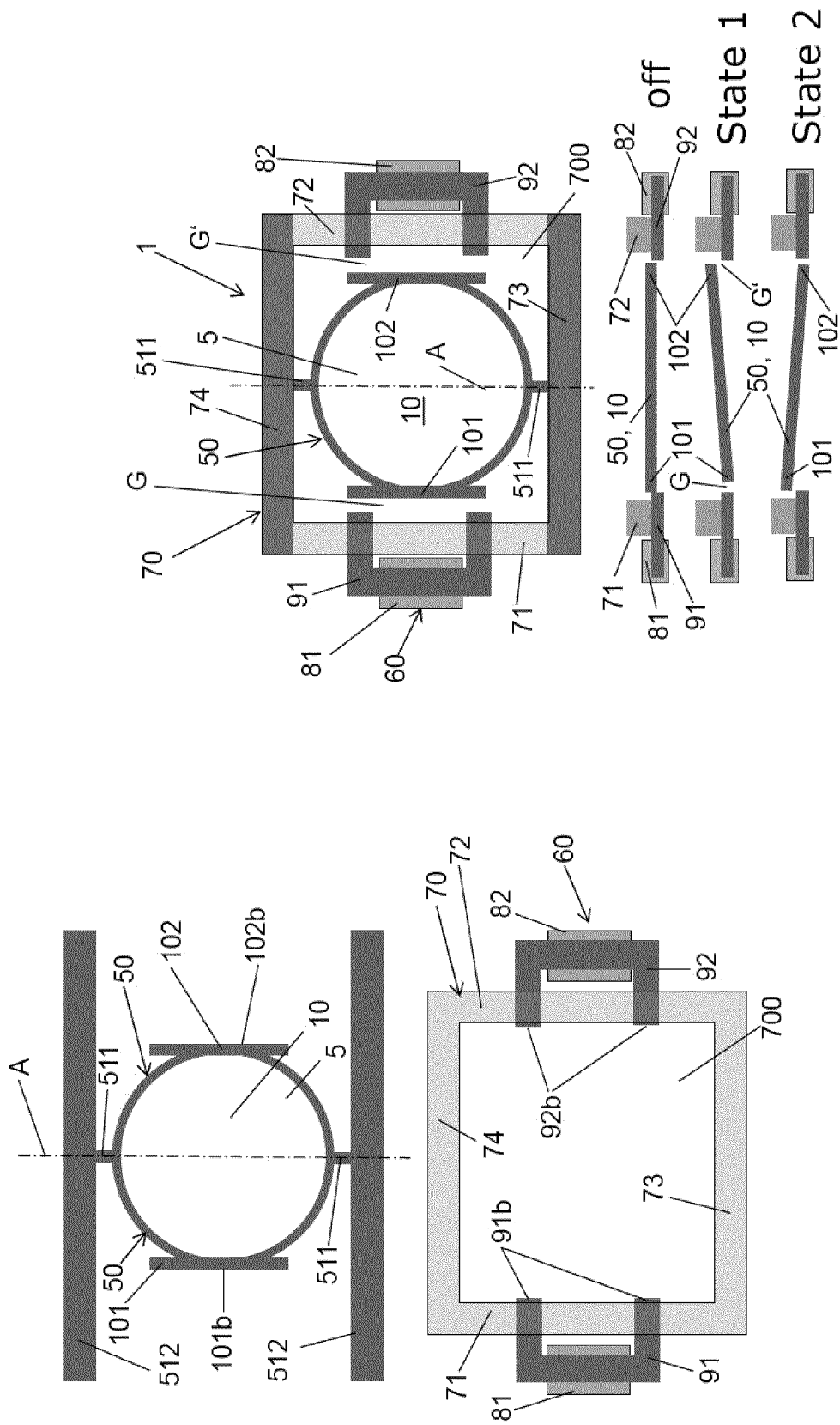
FIG. 12 shows an embodiment of the optical device according to the invention that does not employ a hard stop of the carrier.

FIG. 12 shows different views of a further embodiment according to the invention, wherein the optical device 1 is in principle designed as described in conjunction with FIG. 2. Further, in the present embodiment, the carrier 50 is configured to perform a contact-free tilt, wherein the carrier 50 does not contact with the guiding structures 101, 102 the return structures 91, 92. The carrier 50 comprises a rest position in which it is not pivoted and comprises a different height along a normal of the plate member 10 than the first and second magnetic flux return structure 91, 92. In its tilted first position the first gap G is smaller than the second gap G', while in its tilted second position, the second gap G' is smaller than the first gap G as shown in the lower right hand corner of FIG. 12.

Figure 13:
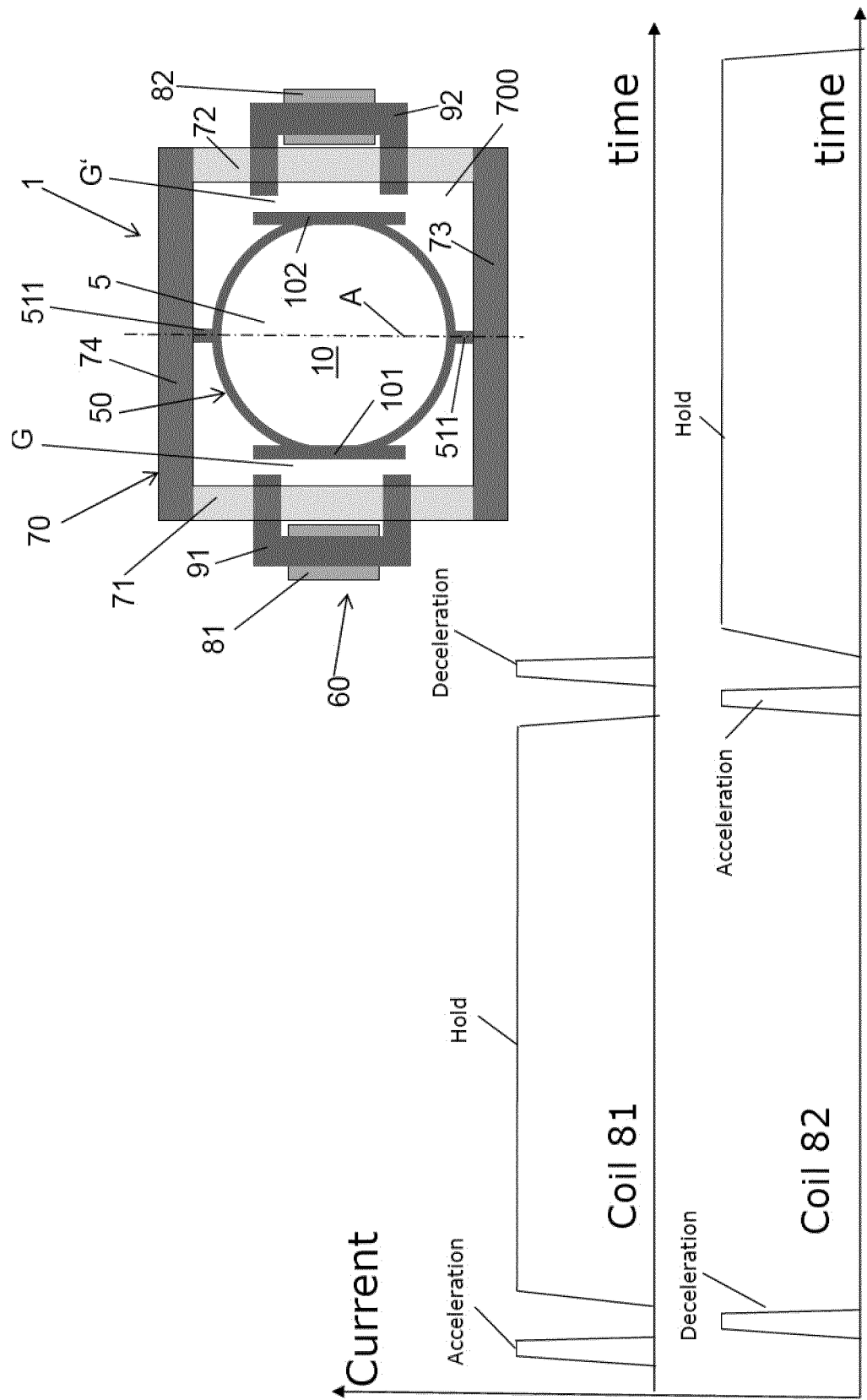
FIG. 13 shows a schematical representation of a drive signal (current) that accelerates, decelerates and holds the carrier, which drive signal may be used particularly in conjunction with the embodiment shown in FIG. 12.

FIG. 13 shows optimized drive signals (e.g. current signals) that are applied by the electrical energy source 2 to the first and second coil 81, 82. According thereto, after the first coil 81 has been accelerated, a current is applied to the second coil 81 so as to decelerate the carrier 50 when the latter approaches the first position. After the decelerating current has been applied to the second coil 82, a holding current is applied to the first coil 81 so as to hold the carrier 50 for a pre-defined time-interval in the first position. Thereafter, an accelerating current is applied to the second coil 82 and the carrier 50 is tilted into the second position. Also here, the carrier 50 is decelerated and held according to the principle described above.

Figure 14:
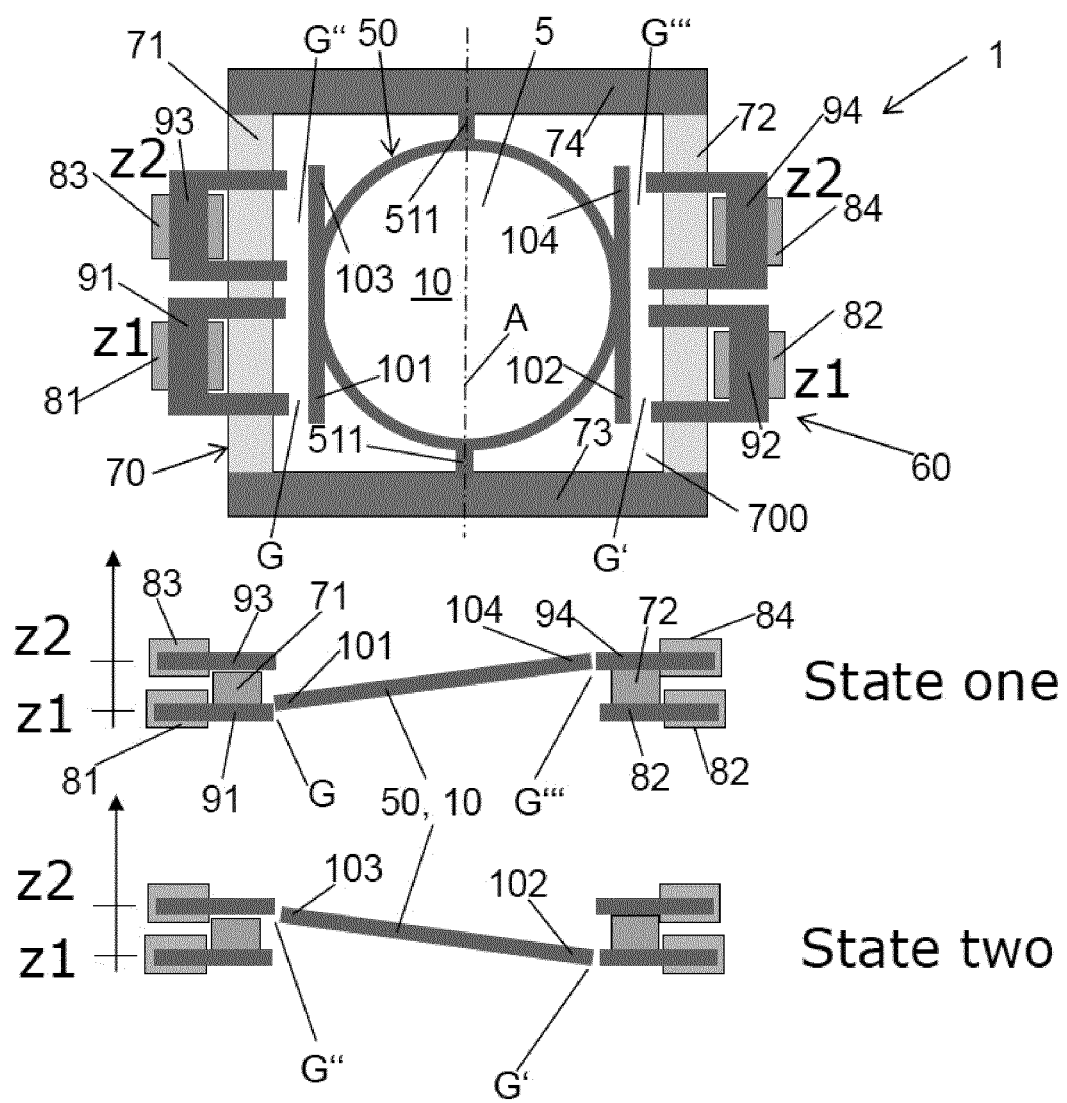
FIG. 14 shows a further embodiment of an optical device according to the invention that can be used to minimize vibration by fixing the carrier/transparent plate member in each position via the reluctance principle on both sides of the carrier by means of two coils in opposing positions and different heights.

FIG. 14 shows a further embodiment of an optical device according to the invention, wherein the carrier 50 is also configured to perform a contact-free tilting.

For this, the optical device 1 is in principle designed as described in conjunction with FIG. 2 but comprises the following further/different features.

The reluctance actuator means 60 further comprises a third electrically conducting coil 83 mounted on an (e.g. u-shaped) third magnetic flux return structure 93 that is connected to the first leg 71 of the support 70, and a third magnetic flux guiding structure 103 connected to the carrier 50, wherein the third guiding structure 103 can be formed integrally with the first guiding structure 101. Further, the third magnetic flux guiding structure 103 is separated from said third magnetic flux return structure 93 by a third gap G". Furthermore, the reluctance actuator means 60 comprises a fourth electrically conducting coil 84 mounted on a (e.g. u-shaped) fourth magnetic flux return structure 94 that is connected to the second leg of the support 70, and a fourth magnetic flux guiding structure 104 connected to the carrier 50, wherein said fourth guiding structure 104 can be integrally formed with the second guiding structure 102, and wherein said fourth magnetic flux guiding structure 104 is separated from said fourth magnetic flux return structure 94 by a fourth gap G'".

In detail, the third magnetic flux return structure 93 is arranged on the first leg 71 of the support 70 besides the first magnetic flux return structure 91, and the fourth magnetic flux return structure 94 is arranged on the second leg 72 of the support 70 besides the second magnetic flux return structure 92. Finally, the first return structure 91 faces the second return structure 92, while the third return structure 93 faces the fourth return structure in a direction perpendicular to the first axis A, respectively.

Furthermore, the first and the second magnetic flux return structure 91, 92 are arranged at a first height z1 with respect to the support 70 (e.g. along a normal of the plate member 10), and the third and the fourth magnetic flux return structure 93, 94 are arranged at a different (here e.g. higher) second height z2 with respect to the support 70. Thus, when the carrier 50 is tilted into the first position, the first and the fourth gap G, G'" are minimal, and wherein particularly when the carrier 50 is tilted into the second position, the second and the third gap G', G" are minimal.

Here, for tilting the carrier 50, the control unit 3 is configured to cause the electric energy source 2 to apply a first current to said first coil 81 and a fourth current to said fourth coil 84 so that two reluctance forces are generated that reduce the first and the fourth gap G, G'" at the same time and tilt the carrier 50 into its first position, and wherein the control unit 3 is further configured to cause the electric energy source 2 to apply a second current to said second coil 82 and a third current to said third coil 83 so that two reluctance forces are generated that reduce the second and the third gap G', G" at the same time and tilt the carrier 50 into its second position. In particularly, the first and fourth current or the second and third current can be the same and generated by the same energy source.

Advantageously, this allows to reduce the vibration in the system since the carrier 50/plate member 10 is held in each position via the reluctance principle on both sides between a pair of opposing coils 81, 84 and 83, 82. Furthermore, thereby the spring load of the elastic coupling 511 to minimize vibrations can be reduced and the carrier 50 accelerates faster.

Figure 15:
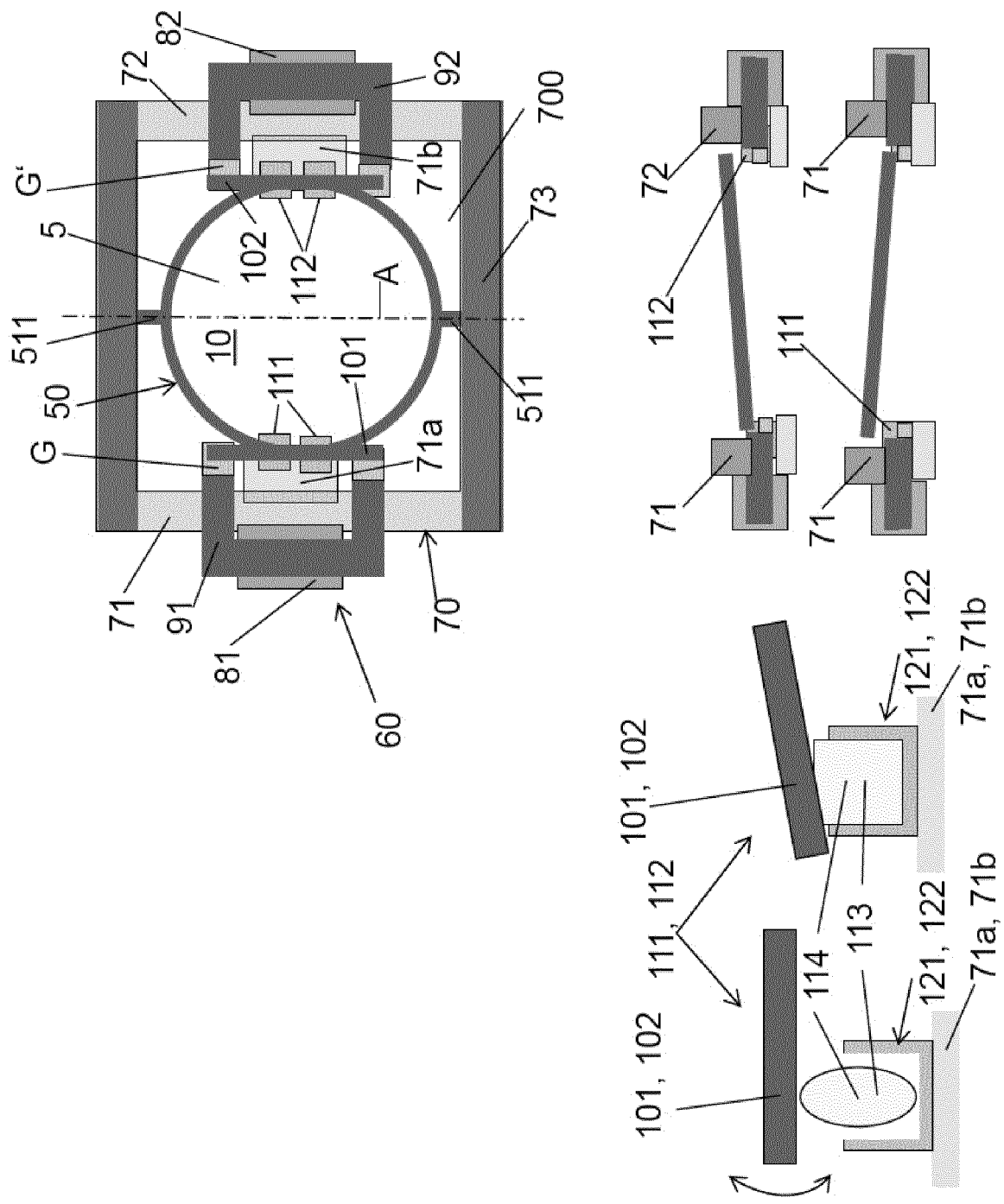
FIG. 15 shows an embodiment of an optical device according to the invention that employs a stop for the carrier that can be dampened in particular by means of a suitable material (e.g. silicone)

FIG. 15 shows a further embodiment of an optical device 1 according to the invention, wherein the optical device 1 is designed as described with reference to FIG. 2. In addition, the device 1 comprises at least a first stopping means 111 configured to stop the carrier 50 in the first position, as well as at least a second stopping means 112 configured to stop the carrier 50 in the second position. Here, the first stopping means 111 is supported on a region 71a of the first leg 71 of the support 70, and the second stopping means 112 is supported on a region 72a of the second leg 72 of the support. Each stopping means 111, 112 may comprise at least one damping member 121, 122 comprising e.g. a cavity 113 in which an elastic damping material 114 like silicone is arranged that is configured to deform and thus dampen an impact of the respective magnetic flux guiding structure 101, 102 on the associated stopping means 111, 112.

Figure 16:
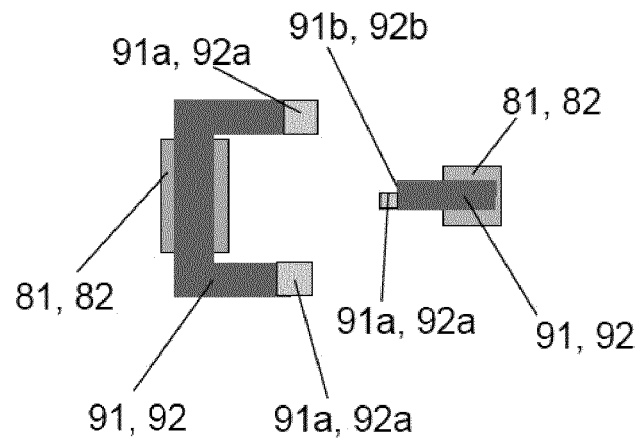
FIG. 16 shows a detail of a magnetic flux return structure that forms part of a reluctance actuator.

As indicated in FIG. 16, the respective return structure 91, 92 comprises a recess for receiving the respective magnetic flux guiding structure 101, 102 (particularly leading to a quadratic reluctance force) at the respective gap G, G'.

In detail, the magnetic flux return structures 91, 92 thus comprise a protrusion or nose that defines a surface area 91a, 92a that faces the respectively approaching magnetic flux guiding structure 101, 102 leading to an essentially L-shaped gap G, G' in cross section. Particularly, a face side 91b, 92b goes off at a right angle from the respective surface area 91a, 92a, which face side 91b, 92b faces a face side 101b, 102b of the associated magnetic flux guiding structure 101, 102.

Figure 17:
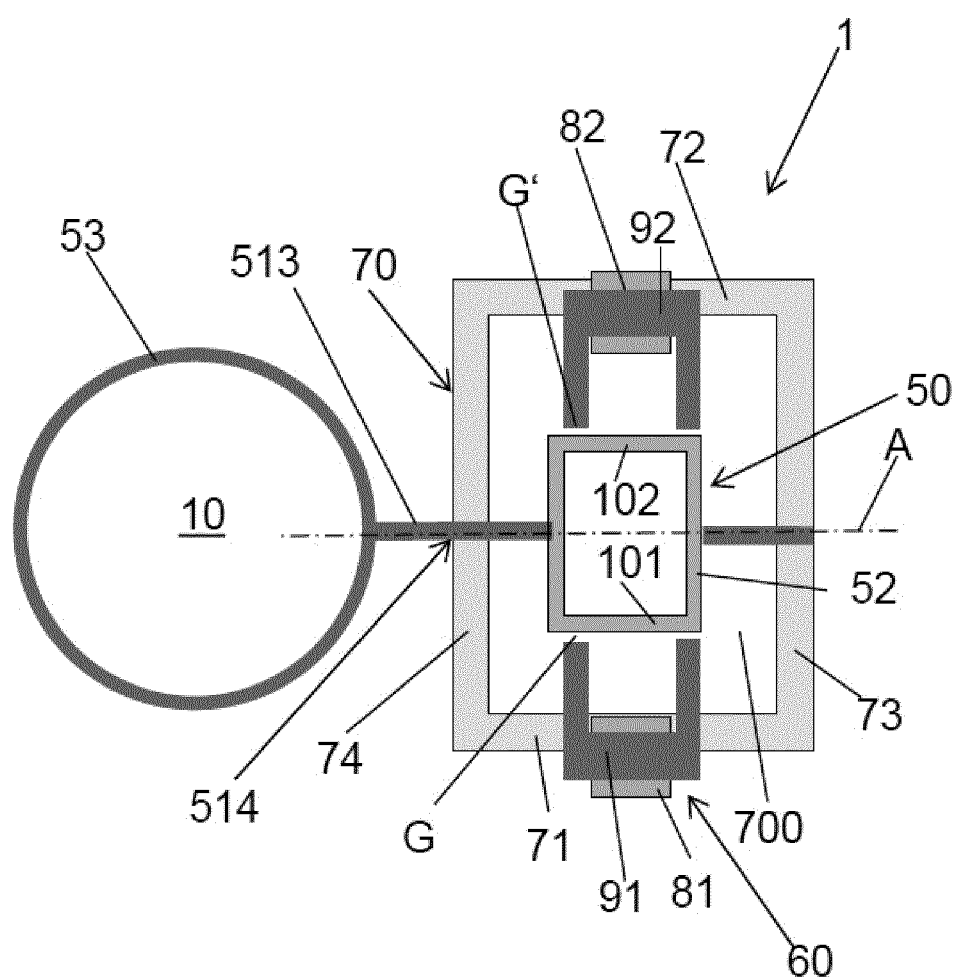
FIG. 17 shows a further embodiment of the present invention, where the transparent plate member for refracting and therewith shifting the light beam is arranged outside the support.

FIG. 17 shows a further embodiment of an optical device 1 according to the invention which is designed as the device 1 shown in FIG. 2 with the difference that the carrier 50 is now not completely arranged in the aperture 700, but comprises a first carrier member 52 to which the first and second magnetic flux guiding structures are (e.g. integrally) connected, wherein particularly the first magnetic flux guiding structure 101 is connected to or forms a first section of the first carrier member 52, which first section faces a second section of the first carrier member 52, wherein the second section forms the second magnetic flux guiding structure 102 or is connected to the latter.

Further, the first carrier member 52 is connected to a second carrier member 53 by a bar 513 that coincides with the first axis A about which the carrier 50 can be tilted into the first and second position as before. This bar 513 is supported via a bearing 514 on the fourth leg 74 of the support frame 70 and is aligned with the first bar 511 via which the carrier 50 is elastically coupled to the support frame 70.

Now, the first carrier member 52 is arranged in the aperture 700 formed by the support frame 70 and surrounded by the latter, whereas the second carrier member 53, to which the transparent plate member 10 is connected, is arranged outside said aperture 700, i.e., outside said support frame 70, so that said leg 74 of the support 70 extends between the first and the second carrier member 52, 53.

Figure 18:
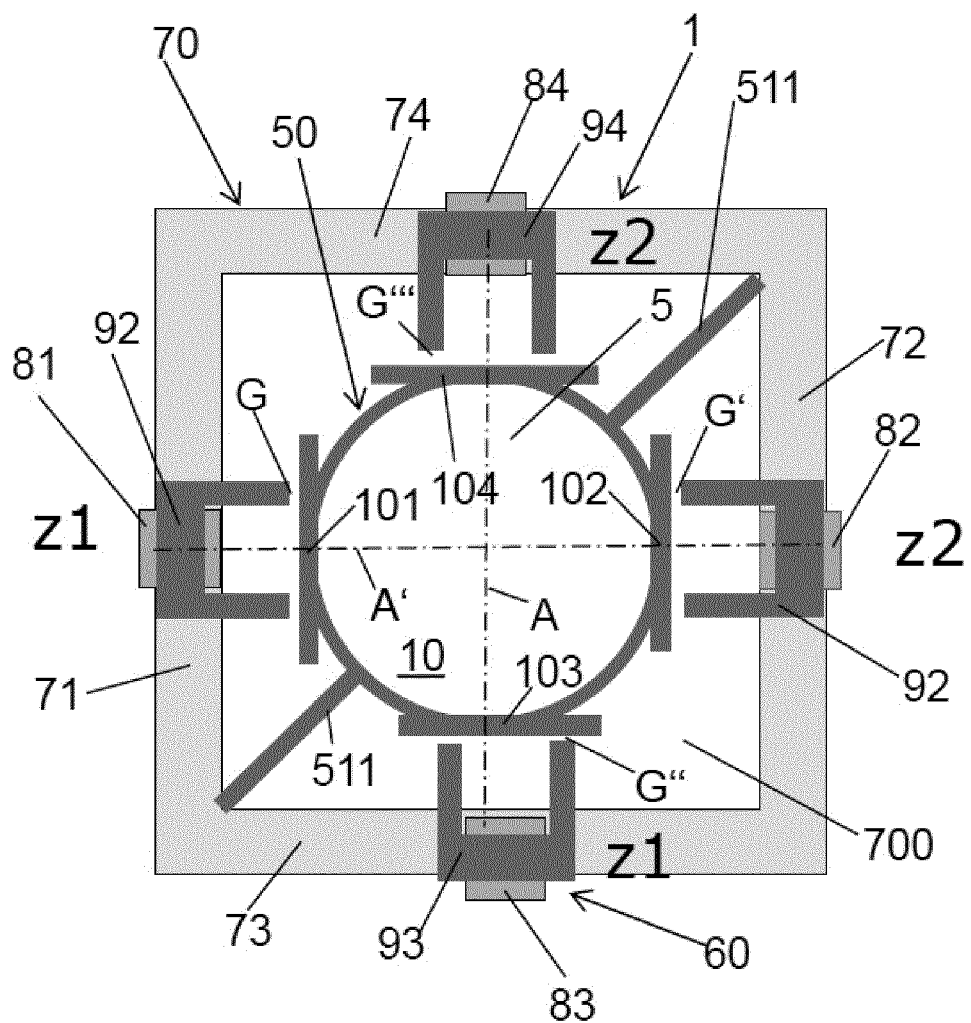
FIG. 18 shows a further embodiment of an optical device according to the invention that allows for a 2D tilting of the carrier and plate member and therefore a shifting of the image by a fraction of a pixel along the x-axis (rows) and/or along the y-axis (columns) of the image plane.

FIG. 18 shows an embodiment of the optical device 1 according to the invention that allows to tilt the carrier 50 in 2D. Here, the optical device 1 comprises a rectangular (e.g. square) support frame 70, comprising four legs 71, 72, 73, 74 which are each connected with their ends to a neighboring leg such that the rectangular or square support frame 70 results that surrounds an aperture 700. Particularly, the support frame 70 comprises a first leg 71 that extends parallel to a second leg 72 which faces the first leg 71. Further, the first and the second leg 71, 72 are connected by a third leg 73 and a fourth leg 74, wherein the third leg 73 and the fourth leg 74 also extend parallel to each other and face each other. Particularly, a first bar 511 couples a first section of the carrier 50 that is formed as a circumferential (e.g. circular) frame member to a corner region of the support frame 70, while a further first bar 511 couples a second section of the carrier (which second section faces the first section of the carrier 50) to a further corner region of the support frame 70 so that the two first bars are aligned with each other end extend along a diagonal of the support frame 70. These springs 511 at the corner regions are rather weak but still configured to keep the plate member 10 that is attached to the carrier 50 in place if no current is applied to the coils (which will be described below).

Now, for tilting the carrier 50 and the plate member 10 connected thereto, the optical device 1 comprises (as before) a reluctance actuator means 60 that comprises a first electrically conducting coil 81 mounted on a (e.g. u-shaped) first magnetic flux return structure 91 that is connected to the first leg 71 of the support frame 70, and a first magnetic flux guiding structure 101 connected (e.g. integrally) to the carrier 50, wherein said first magnetic flux guiding structure 101 is separated from said first magnetic flux return structure 91 by a first gap G. Further, the reluctance actuator means 60 comprises a second electrically conducting coil 82 mounted on a (e.g. u-shaped) second magnetic flux return structure 92 that is connected to the second leg 72 of the support frame 70, and a second magnetic flux guiding structure 102 connected (e.g. integrally) to the carrier 50, wherein said second magnetic flux guiding structure 102 is separated from said second magnetic flux return structure 92 by a second gap G'.

Now, in contrast to most of the 1D designed described herein, the reluctance actuator means 60 further comprises a third electrically conducting coil 83 mounted on a (e.g. u-shaped) third magnetic flux return structure 93 that is connected to the third leg 73 of the support 70, and a third magnetic flux guiding structure 103 connected (e.g. integrally) to the carrier 50, wherein said third magnetic flux guiding structure 103 is separated from said third magnetic flux return structure 93 by a third gap G". Finally, the reluctance actuator means 60 also comprises a fourth electrically conducting coil 84 mounted on a (e.g. u-shaped) fourth magnetic flux return structure 94 that is connected to the fourth leg 74 of the support frame 70, and a fourth magnetic flux guiding structure 104 connected (e.g. integrally) to the carrier 50, wherein said fourth magnetic flux guiding structure 104 is separated from said fourth magnetic flux return structure 94 by a fourth gap G'".

Particularly, the first magnetic flux guiding structure 101 is (e.g. integrally) connected to a first section of the circumferential carrier 50, while the second magnetic flux guiding structure 102 is (e.g. integrally) connected to an opposing second section of the circumferential carrier 50. Likewise, the third guiding structure 103 is (e.g. integrally) connected to a third section of the carrier 50, while the fourth guiding structure 104 is (e.g. integrally) connected to a fourth section of the carrier. Also here, the third and the fourth section face each other as shown in FIG. 18.

The carrier 50 is now arranged such in said aperture 700 of the support 70 that it is positioned between the four magnetic flux return structures 91, 92, 93, 94 that respectively face their associated guiding structures 101, 102, 103, 104.

For tilting the carrier 50 and therewith the plate member 10, the first magnetic flux return structure 91 is arranged at a first height z1 with respect to the support frame 70 (e.g. along a normal of the plate member 10), and the second magnetic flux return structure 92 is arranged at a different second height z2 with respect to the support 70 (e.g. along said normal). Further, the third magnetic flux return structure 93 is arranged at said first height z1, whereas the fourth magnetic flux return structure 94 is arranged at said second height z2.

Here, the control unit 3 is configured to cause the electric energy source 2 to apply a first current to said first coil 81 and at the same time a second current to said second coil 82 so that two reluctance forces are generated that reduce the first and the second gap G, G' at the same time and tilt the carrier 50 about a first axis A (running parallel to legs 71, 72) from a first (rest) position into a tilted second position. Further, the control unit 3 is configured to cause the electric energy source 2 to apply a third current to said third coil 83 and at the same time a fourth current to said fourth coil 84 so that two reluctance forces are generated that reduce the third and the fourth gap G",G'" at the same time and tilt the carrier 50 from a third (rest) position about a second axis A' (running parallel to legs 73, 74) in a fourth position.

In this way, the carrier 50 and the transparent plate member 10 can be tilted about two axis A, A' independently and can thus be tilted in 2D. The projected image can therefore be shifted by a fraction of a pixel in x- and/or y-direction (along the rows and/or columns of the pixels).

Figure 19:
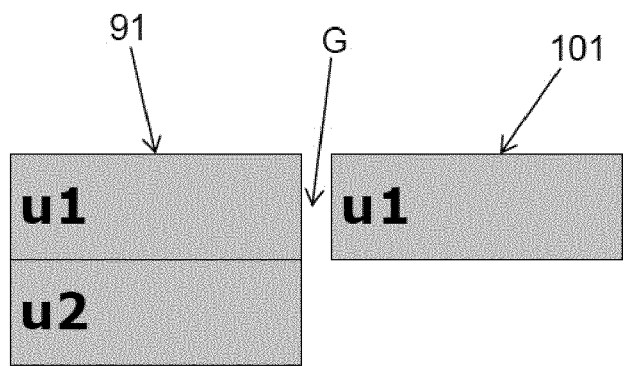
FIG. 19 shows a cross section of a detail of a magnetic flux return structure facing a magnetic flux guiding structure that is separated from the return structure by a gap, wherein the return structure comprises two layers of a different material with different magnetic permeabilities.

FIG. 19 shows a cross section of a detail of a magnetic flux return structure 91 facing a magnetic flux guiding structure 101 (of material u1) that is separated from the return structure 91 by a gap G, wherein the return structure 91 comprises two layers of a different material with different permeability u1, u2, wherein material u1 particularly has a lower permeability than u2. Such a configuration can be used in all embodiments, and serves for achieving different force-displacement curves for the movement. For example, if the magnetic flux guiding structure 101 (u1) is on the same level as the material with the low permeability (u1) then the force pulling it to the material which has a higher permeability (u2) is smaller than the force pulling it to the material with the higher permeability (u2) when the magnetic flux guiding structure 101 is in facing air. This allows for a non-symmetric acceleration.

Figure 20:
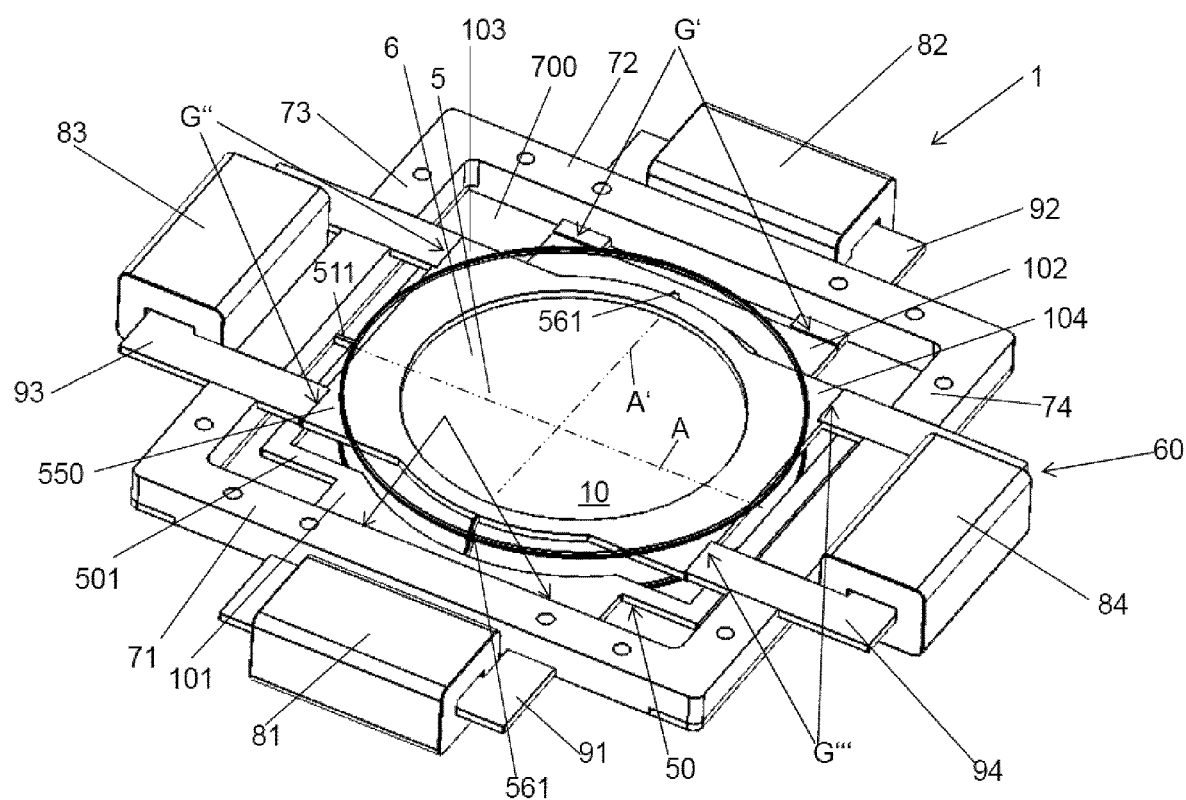
FIG. 20 shows a further embodiment of an optical device of the present invention, wherein the transparent plate member can be tilted in 2D.

Furthermore, FIG. 20 shows a further embodiment of an optical device 1 according to an embodiment of the present invention, wherein the transparent plate member 10 can also be tilted in 2D. Here, again, the optical device 1 comprises a rectangular (e.g. square) support frame 70, comprising four legs 71, 72, 73, 74 which are each connected with their ends to a neighboring leg such that the rectangular or square support frame 70 results that surrounds an aperture 700. Particularly, the support frame 70 comprises a first leg 71 that extends parallel to a second leg 72 which faces the first leg 71. Further, the first and the second leg 71, 72 are connected by a third leg 73 and a fourth leg 74, wherein the third leg 73 and the fourth leg 74 also extend parallel to each other and face each other.

The support frame 70 is configured to support a carrier 50 to which the transparent (e.g. circular) plate member 10 is attached. In detail, the carrier 50 comprises a first frame member 501 and a second frame member 550 that holds the transparent plate member. Both frame members 501, 550 define an aperture 5, 6, respectively, through which apertures 5, 6 the light beam 20 can travel to pass the transparent plate member 10 that shifts the light beam 20/projected pixel due to refraction.

Particularly, the first frame member 501 is elastically coupled to the support frame 70 which surrounds the carrier 50 (i.e. the first and second frame member 501, 550) via two first bars 511 that are connected to the third leg 73 and to the fourth leg 74 of the support 70. The two first bars 511 are aligned with each other and define a first axis A about which the first frame member 501 can be tilted (together with the second frame member 550).

Further, the second frame member 550 in turn is elastically coupled via two (e.g. vertically extending) second bars 561 to the first frame member 501 so that the second frame member 550 and therewith the transparent plate member 10 can be tilted about a second axis A' with respect to the first frame member 501. Here, the two axes A, A' extend perpendicular to each other.

Now, for tilting the transparent plate member 10 in 2D, the optical device 1 comprises (as before) a reluctance actuator means 60 that comprises a first electrically conducting coil 81 mounted on a (e.g. u-shaped) first magnetic flux return structure 91 that is connected to the first leg 71 of the support frame 70, and a first magnetic flux guiding structure 101 connected (e.g. integrally) to the first frame member 501 of the carrier 50, wherein said first magnetic flux guiding structure 101 is separated from said first magnetic flux return structure 91 by a first gap G. Further, the reluctance actuator means 60 comprises a second electrically conducting coil 82 mounted on a (e.g. u-shaped) second magnetic flux return structure 92 that is connected to the second leg 72 of the support frame 70, and a second magnetic flux guiding structure 102 connected (e.g. integrally) to the first frame member 510 of the carrier 50, wherein said second magnetic flux guiding structure 102 is separated from said second magnetic flux return structure 92 by a second gap G'.

Furthermore, the reluctance actuator means 60 also comprises a third electrically conducting coil 83 mounted on a (e.g. u-shaped) third magnetic flux return structure 93 that is connected to the third leg 73 of the support 70, and a third magnetic flux guiding structure 103 connected (e.g. integrally) to the second frame member 550 of the carrier 50, wherein said third magnetic flux guiding structure 103 is separated from said third magnetic flux return structure 93 by a third gap G". Finally, the reluctance actuator means 60 also comprises a fourth electrically conducting coil 84 mounted on a (e.g. u-shaped) fourth magnetic flux return structure 94 that is connected to the fourth leg 74 of the support frame 70, and a fourth magnetic flux guiding structure 104 connected (e.g. integrally) to the second frame member 550 of the carrier 50, wherein said fourth magnetic flux guiding structure 104 is separated from said fourth magnetic flux return structure 94 by a fourth gap G'".

Since, along a normal of the plate member 10, the first frame member 501 is arranged below the second frame member 550, the height of the first and second return structure 91, 92 is correspondingly lower than that of the third and fourth return structure 93, 94.

Summarizing, the carrier 50 is arranged such in said aperture 700 of the support frame 70 that it is positioned between the four magnetic flux return structures 91, 92, 93, 94 that respectively face their associated guiding structures 101, 102, 103, 104.

For tilting the carrier 50 and therewith the plate member 10 the control unit 3 (cf. FIG. 1) is configured to cause the electric energy source 2 (cf. FIG. 1) to apply a first current to said first coil 81 and a second current to said second coil 82 such that when the first current is applied to the first coil 81, magnetic flux generated by the first coil 81 is guided by the first magnetic flux return structure 91 and the first magnetic flux guiding structure 101 via said first gap G resulting in a reluctance force that tilts the first frame member 501 (together with the second frame member 550 and the plate member 10) about the first axis A in the first position so as to reduce said first gap G, and such when the second current is applied to the second coil 82, magnetic flux generated by the second coil 82 is guided by the second magnetic flux return structure 92 and the second magnetic flux guiding structure 102 via said second gap G' resulting in a reluctance force that tilts the first frame member 501 (together with the second frame member 550 and the plate member 10) about the first axis A in the second position so as to reduce said second gap G'.

Further, particularly, the control unit 3 is also configured to cause the electric energy source to apply a third current to said third coil 83 and a fourth current to said fourth coil 84 such that when the third current is applied to the third coil 83, magnetic flux generated by the third coil 83 is guided by the third magnetic flux return structure 93 and the third magnetic flux guiding structure 103 via said third gap G" resulting in a reluctance force that tilts the second frame member 550 with respect to the first frame member 501 about a second axis A' in the third position so as to reduce said third gap G", and such that when the fourth current is applied to the fourth coil 84, magnetic flux generated by the fourth coil 84 is guided by the fourth magnetic flux return structure 94 and the fourth magnetic flux guiding structure 104 via said fourth gap G'" resulting in a reluctance force that tilts the second frame member 550 with respect to the first frame member 501 about the second axis A' in the fourth position so as to reduce said fourth gap G'".

As a result, the transparent plate member 10 can be tilted about two axes A, A' independently, and can thus be tilted in 2D. The projected image can therefore be shifted by a fraction of a pixel in x- and/or y-direction (along the rows and/or columns of the pixels).

Figure 21:
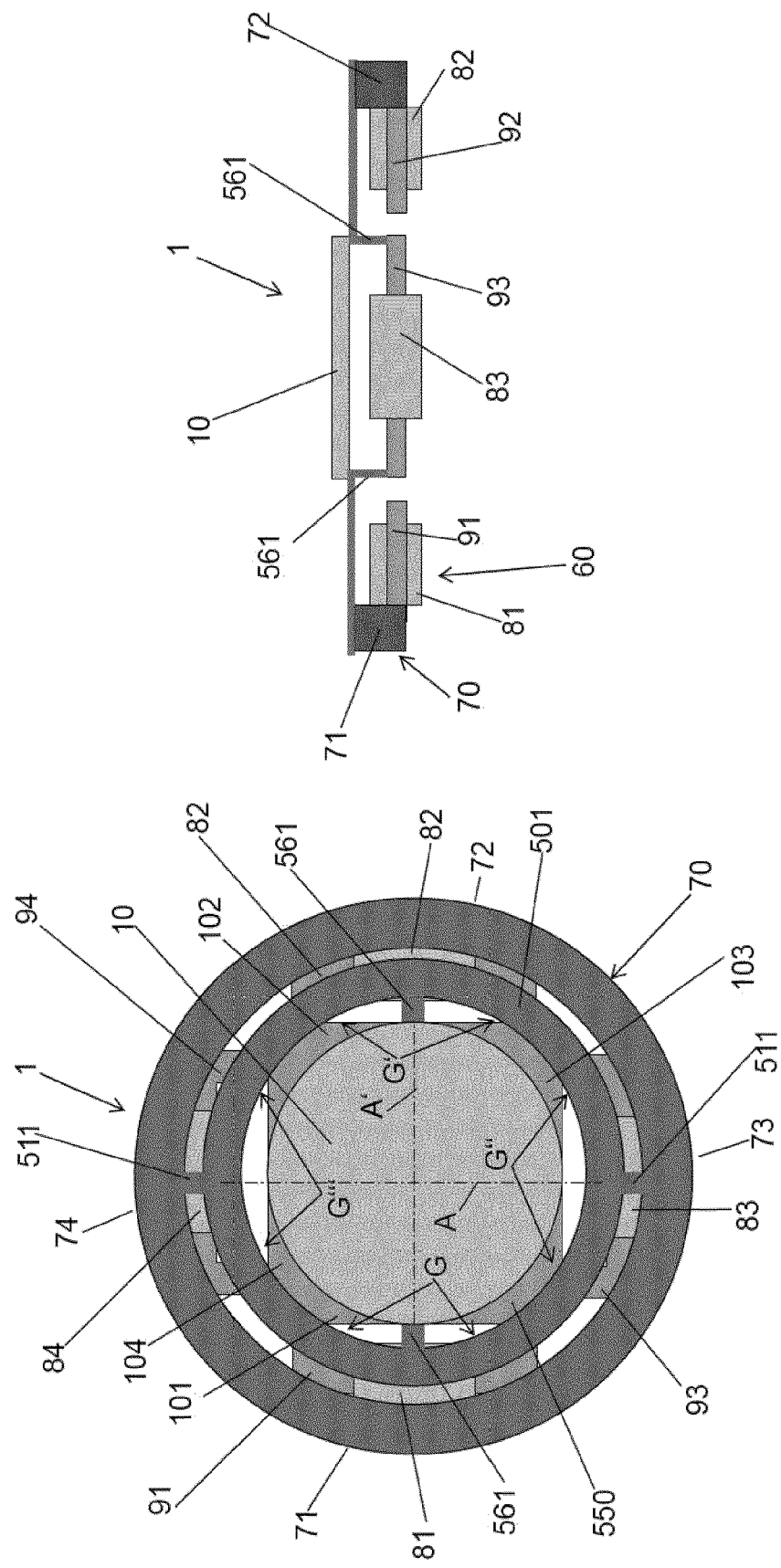
FIG. 21 shows different views of another embodiment of the optical device according to the invention that allows a 2D tilting of the transparent plate member.

Furthermore, FIG. 21 shows another embodiment of an optical device 1 according to the invention that allows a 2D tilting of the transparent plate member 10. Here, in contrast to FIG. 20, the support frame 70 is circular and the legs 71, 72, 73, 74 of FIG. 20 are now curved sections of the support frame 70 that are connected at their ends to neighboring sections so as to form said circular support frame 70.

Further, in contrast to FIG. 20 all (e.g. u-shaped) magnetic flux return structures 91, 92, 93, 94 are arranged at the same height with respect to support 70 and all magnetic flux guiding structures 101, 102, 103, 104 are connected to the second frame member 550 which holds the transparent plate member 10. Here, the second frame member 550 is elastically coupled/connected via two second bars 561 that extend essentially along a normal of the plate member 10 to the circular first frame member 501 that is in turn elastically coupled via two first bars 511 to the support frame 70. Here all reluctance forces act at first on the second frame member 550. For instance, when an appropriate current signal is applied to the first or the second coil 81, 82, the first bars 511 can be twisted and the whole carrier 50 (i.e. the first and the second frame member 501, 550 as well as the plate member 10) is tilted to reduce the first or second gap G, G' about a first axis A. However, in case an appropriate current signal is applied to the third or the fourth coil 83, 84, the first bars 511 cannot be twisted since they extend along the direction of the driving force. Now, the second bars 561 are twisted leading to a tilting movement of the second frame member 550 and the plate member 10 connected thereto alone (about a second axis A' running orthogonal to the first axis A).

Figure 22:
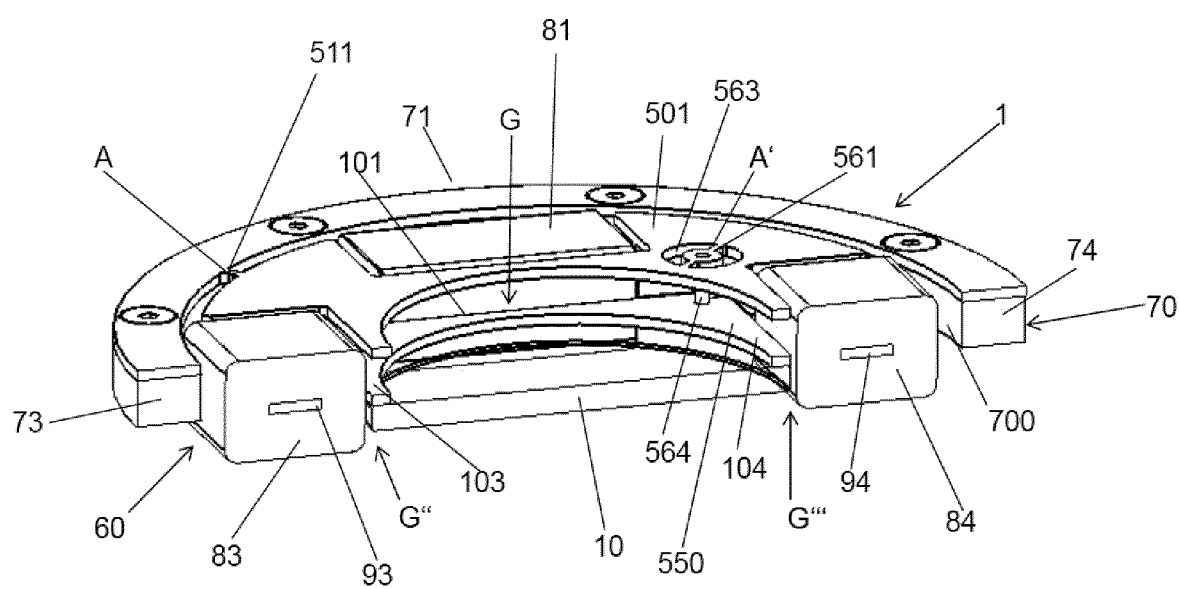
FIG. 22 shows a cross sectional view of a further embodiment of the optical device according to the invention that allows a 2D tilting of the transparent plate member.

Finally, FIG. 22 shows yet another embodiment of an optical device 1 according to the invention of the kind shown in FIG. 21 that also allows a 2D tilting of the transparent plate member 10. Here, in contrast to FIG. 20, the support frame 70 also comprises a circular shape as shown in FIG. 21 and all coils 91, 92, 93, 94 are arranged inside the aperture 700 defined by the support frame 70 in contrast to FIG. 21. Also here, the second frame member 550 to which the transparent plate member 10 for refracting and shifting the light beam 20 is connected is elastically coupled via two horizontally extending second bars 561 to the first frame member 501 which in turn is elastically coupled via two first bars 511 to the support frame 70.

Here, the horizontally extending second bars 561 are arranged in corresponding openings 563 of the first frame member 501, respectively and are each connected via a further bar 564 that runs perpendicular to the respective second bar 561 and connects the latter with the second frame member 550.

The two second frame members 561 are aligned with each other end extend along (or define) a second rotation axis A' about which the second frame member 550 and transparent plate member 10 are pivoted, while the aligned first bars 511 define the first axis A about which the first frame member 501 (together with the second frame member 550) is pivoted.

Also here, the reluctance forces act on the second frame member 550 according to the principle described with respect to FIG. 21.

As a result, the transparent plate member 10 can again be tilted about two axes A, A' independently, and can thus be tilted in 2D. The projected image can therefore be shifted by a fraction of a pixel in x- and/or y-direction (along the rows and/or columns of the pixels).

Figure 23:
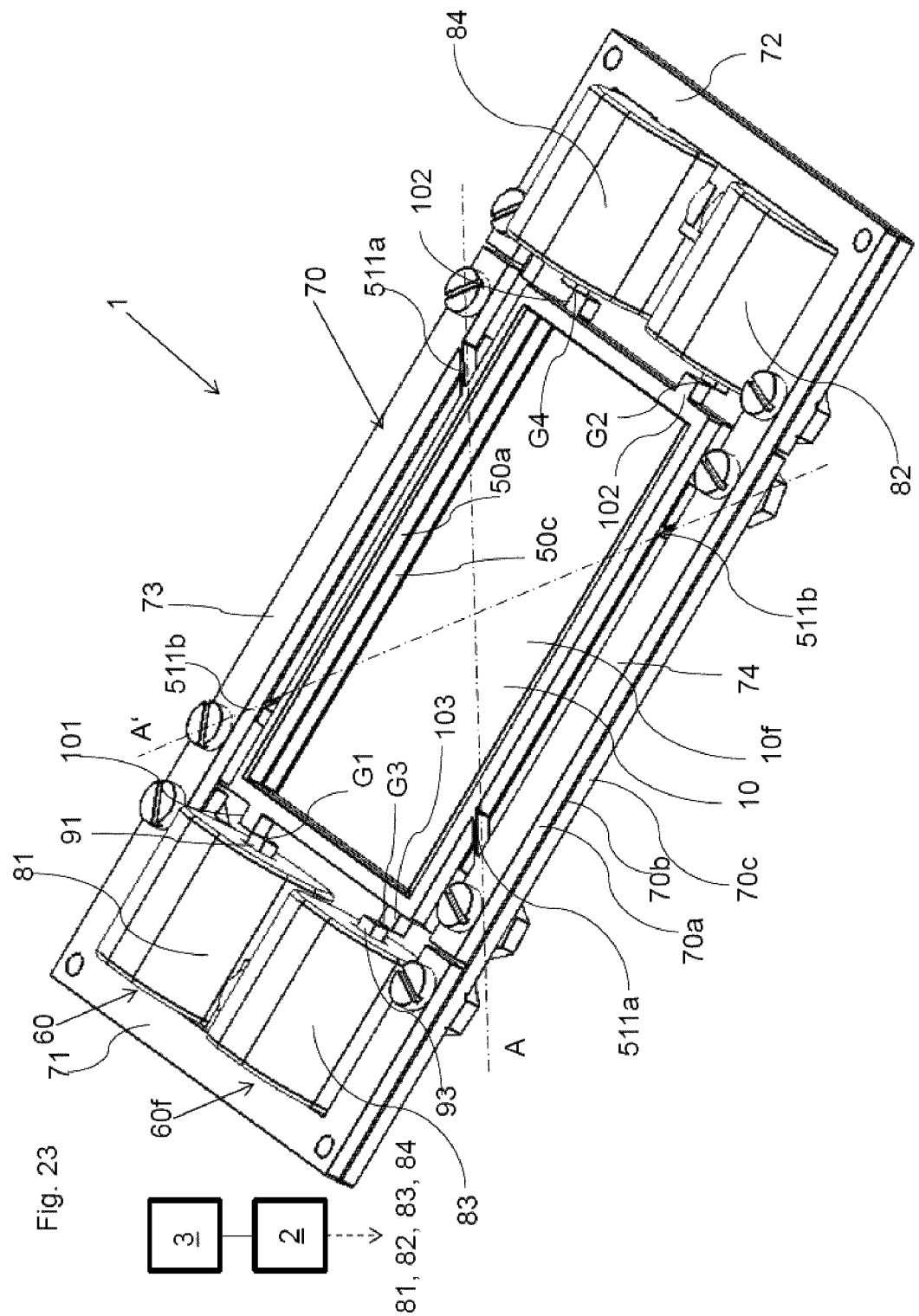
FIG. 23 shows a perspective view of a further embodiment according to the invention comprising multiple layers.

FIG. 23 shows together with FIGS. 24 to 28 a further embodiment of an optical device 1 according to the invention that allows to tilt a transparent member 10 in 1D between a first and a second position about a first axis A and a further (essentially parallel) transparent member 10f in 1D between a third and a fourth position about a second axis A' such that a light beam passing through the plate members 10, 10f can shifted by a fraction of a pixel in 2D (see also above).

Here, as before, the transparent plate members 10, 10f comprise two parallel, flat surfaces, respectively, that face away from each other and extend along the extension plane of the respective plate member 10, 10f. Thus, a light beam passing the plate members 10, 10f gets refracted at each surface and finally the incident light beam 20 runs parallel to the transmitted light beam 20. Particularly said positions, i.e., the tilting angles, are selected such that the shift ΔP of the light beam 20 corresponds to a fraction (e.g. one-half) of a pixel of the image 30 (cf. also FIG. 1).

In detail, the optical device 1 according to FIG. 23 comprises a circumferential (e.g. rectangular or square) support 70 which surrounds two parallel carriers 50a, 50c to which said plate member 10, 10f are rigidly mounted. The support 70 or at least parts thereof can be made out of steel or another suitable material. The two carriers 50a, 50c define congruent apertures through which the light beam 20 (cf. also FIG. 1) can pass so as to pass the transparent plate members 10 and 10f.

The support 70 is formed as a support frame 70 that also defines a central aperture in which the carriers 50a, 50c and the respective plate members 10, 10f are arranged.

The support frame 70 comprises four longitudinal regions or limbs 71, 72, 73, 74 which are each (e.g. integrally) connected with their ends to a neighboring region such that a rectangular or square support frame 70 is formed. Particularly, the support frame 70 comprises a first longitudinal region 71 that extends parallel to an opposing second longitudinal region 72. The first and the second regions 71, 72 are connected by a third region 73 and a fourth region 74, wherein the third region 73 and the fourth region 74 also extend parallel to each other.

The two carriers 50a, 50c are preferably formed as circumferential first and second frame members 50a, 50c, wherein the first frame member 50a is elastically coupled via two first bars 511a that are aligned with each other and that define the first axis A that runs diagonally across the support frame 70, and wherein the second frame member 50c is elastically coupled via two second bars 511b that are aligned with each other, too, and define the second axis A' that also runs diagonally across the support frame 70 as shown in FIG. 23.

Figure 24:
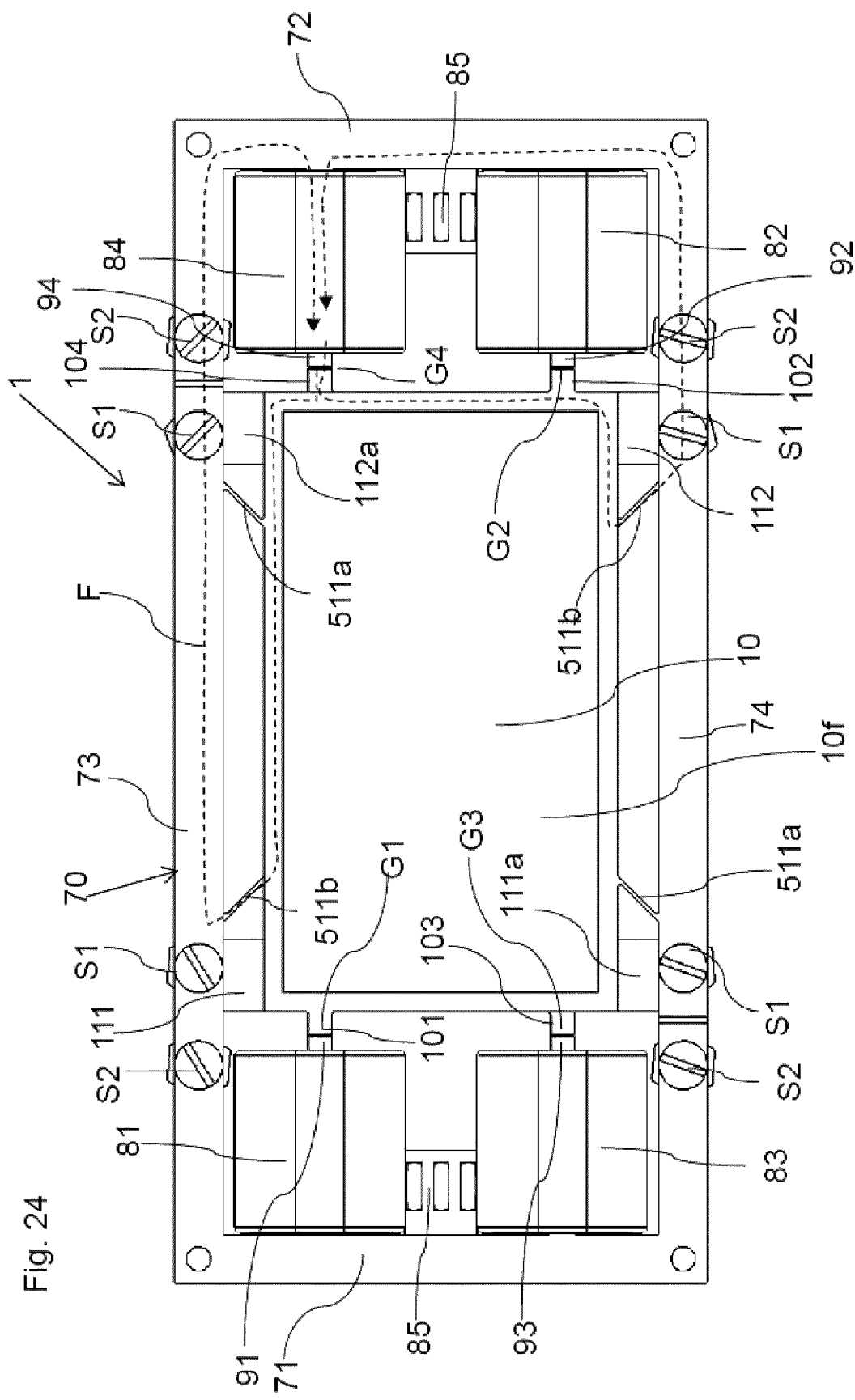
FIG. 24 shows a plan view of the embodiment shown in FIG. 23.

For tilting the plate members 10, 10f, the device 1 comprises reluctance actuator means 60, 60f, namely a reluctance actuator means 60 comprising a first electrically conducting coil 81 that is arranged on a first magnetic flux return structure 91 that protrudes inwards from the first region 71 of the support 70 towards the frame members 50a, 50c. wherein said first return structure 91 faces, with an offset, a first magnetic flux guiding structure 101 formed by the first frame member 50a, wherein said first magnetic flux guiding structure 101 is separated from said first magnetic flux return structure 91 by a first gap G1. Further, the reluctance actuator means 60 comprises a second electrically conducting coil 82 mounted on a second magnetic flux return structure 92 that protrudes (parallel to the first return structure 91) inwards from said second region 72 of the support 70 towards the frame members 50a, 50c, wherein the second magnetic flux return structure 92 faces, with an offset, a second magnetic flux guiding structure 102 formed by the first frame member 50a, wherein said second magnetic flux guiding structure 102 is separated from said second magnetic flux return structure 92 by a second gap G2. Particularly, the discontinuities 75a, 76a, 75c, 76c between the screws S1, S2 (cf. FIGS. 24 and 26) are responsible for separating e.g. magnetic return structures 102 and 94 preventing a parasitic force on gap G2. Preferably, some screws, namely S1, are magnetically conductive to guide the flux, while others, namely S2, are not. Furthermore, the layer 70b/or gap R between top and bottom layer 70a, 70c prevents flux from crossing. As an example the guiding of magnetic flux F is indicated in FIG. 24.

Similarly, the further reluctance actuator means 60f comprises a third electrically conducting coil 83 mounted on a third magnetic flux return structure 93 that protrudes inwards from the first region 71 of the support 70, and a third magnetic flux guiding structure 103 formed by the second frame member 50c, wherein said third magnetic flux guiding structure 103 is separated from said third magnetic flux return structure 93 by a third gap G3, and wherein the further reluctance actuator 60f means further comprises a fourth electrically conducting coil 84 mounted on a fourth magnetic flux return structure 94 that protrudes inwards from the second portion 72 of the support frame 70, and a fourth magnetic flux guiding structure 104 formed by the second frame member 50c, wherein said fourth magnetic flux guiding structure 104 is separated from said fourth magnetic flux return structure 94 by a fourth gap G4. The reluctance actuators 60, 60f function according to the principles already described above.

Figure 26:
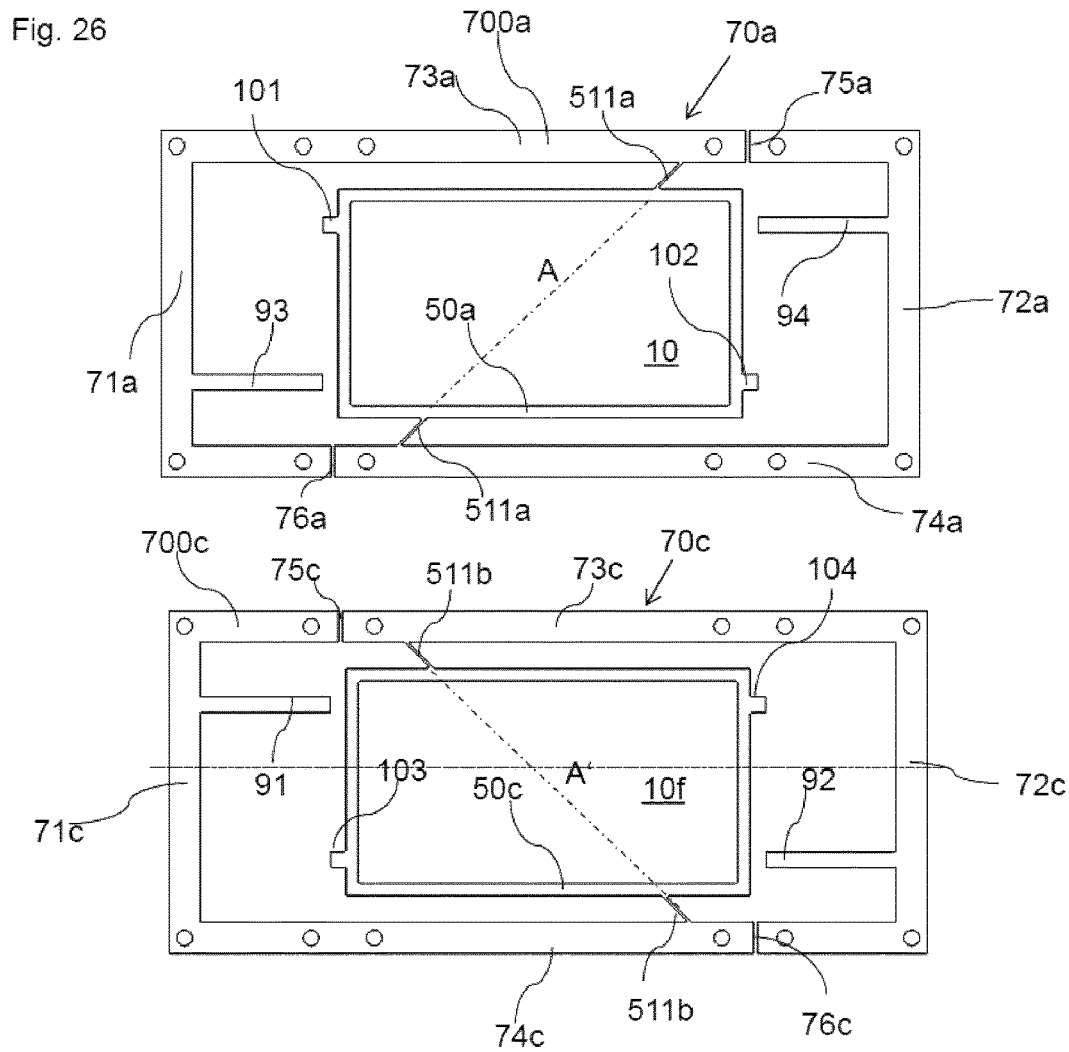
FIG. 26 shows the top layer (upper part) and bottom layer (lower part) of the embodiment shown in FIGS. 23 and 24.

As shown in FIG. 26, the support 70, the first frame member 50a, and the second frame member 50c are formed by at least a top layer 70a and a bottom layer 70c which are arranged on top of each other. Here, the bottom layer 70c preferably comprises a shape that is identical to the shape of the top layer 70a, but the bottom layer 70c is attached to the top layer such that the bottom layer 70c is rotated with respect to the top layer by 180° about a central axis (indicated by a dotted line) lying in the extension plane of the bottom layer 70c (and running parallel to the third and second frame regions or limbs 73c, 74c.

Particularly, the top layer 70a comprises an outer (e.g. rectangular) frame member 700a formed by longitudinal regions or limbs 71a, 72a, 73a, 74a, which outer frame member 700a is integrally connected to the first frame member 50a via said first bars 511a, wherein the outer frame member 700a surrounds the first frame member 50a. Further, the bottom layer 70c comprises an outer (e.g. rectangular) frame member 700c formed by longitudinal regions/limbs 71c, 72c, 73c, 74c, which outer frame member 700c is integrally connected to the second frame member 50c via said second bars 511b, wherein the outer frame member of the bottom layer 70c surrounds the second frame member 50c.

As can further be inferred from FIG. 26, the top layer 70a comprises two portions 94, 93 protruding inwards from the outer frame member 700a of the top layer 70a, which portions form the third and fourth magnetic flux return structure 93, 94. Particularly, one portion 93 protrudes inwards from the first limb 71a while the other portion 94 protrudes inwards from the second limb 72a.

Furthermore, the bottom layer 70c comprises two portions 91, 92 protruding inwards from the outer frame member 700c of the bottom layer 70c, which portions form the first and second magnetic flux return structure 91, 92. Particularly, one portion 91 protrudes inwards from the first limb 71c while the other portion 92 protrudes inwards from the second limb 72c.

Both layers 70a, 70c are preferably formed out of a metal that allows guiding of the magnetic flux generated by the reluctance actuator 60, 60f. Materials that can be used are also described above in connection with the flux guiding structures 91 to 94, and 101 to 104.

Further, due to this stacked configuration of the top and bottom layer 70a, 70c, the return structures 91, 92, 93, 94 are each offset from the opposing region (e.g. formed as a protruding nose) of the associated guiding structure 101, 102, 103, 104 in a direction normal to the extension plane of the first and second frame member 50a, 50c.

Figure 25:
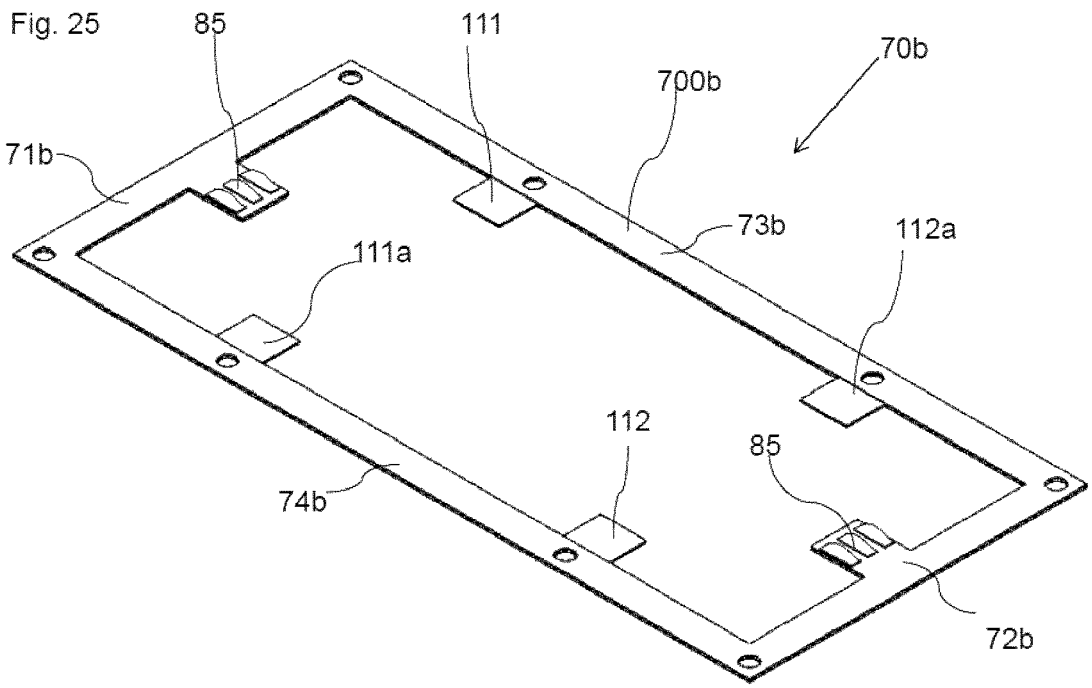
FIG. 25 shows a middle layer of the embodiment shown in FIGS. 23 and 24.

Further, as shown in FIG. 25, the support 70 may comprise a further circumferential layer 70b, which is preferably arranged between the top and the bottom layer 70a, 70c, but may also be mounted in a different position. The middle layer 70b provides a distance between the first and second frame member 50a, 50c so that the two frame members 50a, 50b can be tilted without disturbing one another.

Figure 27:
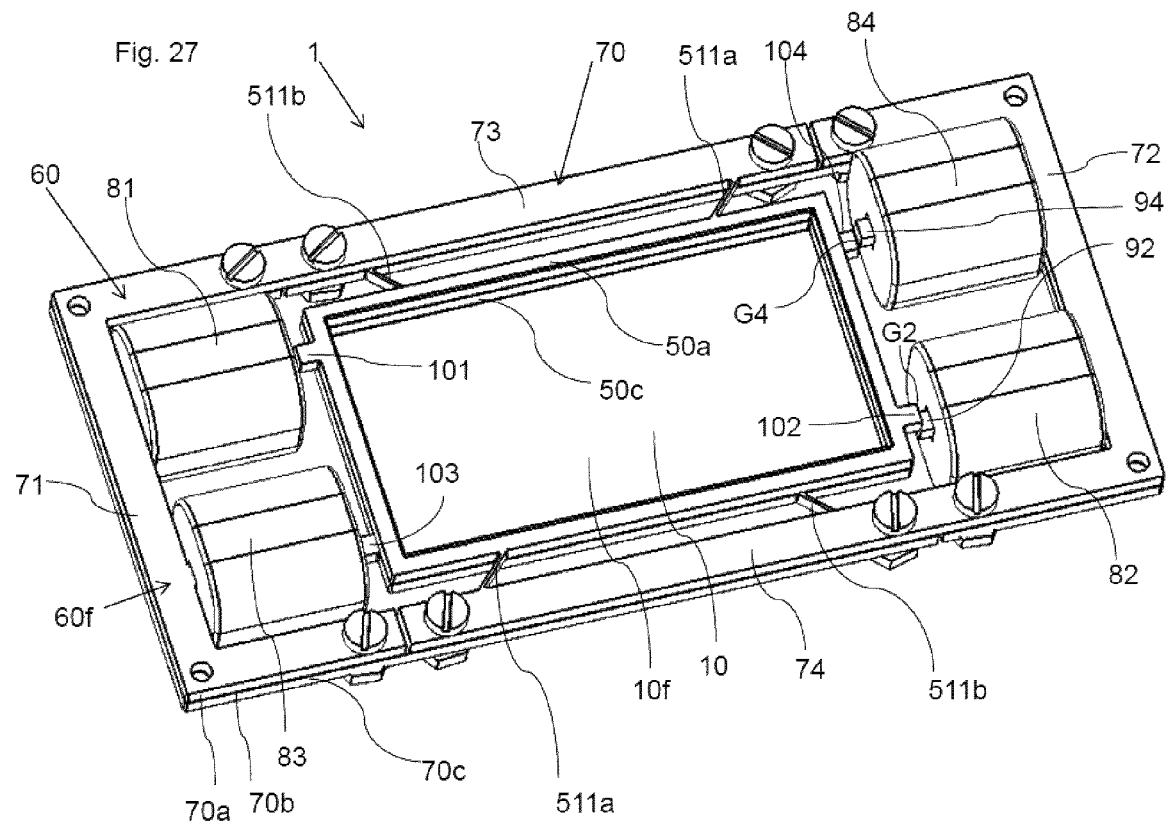
FIG. 27 shows a modification of the embodiment shown in FIGS. 23 and 24 without stops for the carriers of the transparent plate members.

The middle layer 70b can further be used to provide stops 111, 112, 111a, 112a for the tilting movement of the first and second frame member 50a, 50c and the transparent plate members 10, 10f connected thereto. These stops 111, 112, 111a, 112a may be formed as flat rectangular portions protruding inwards from an outer (e.g. rectangular) frame member 700b of the circumferential middle layer. These portions may have a width that is smaller than the width of the longitudinal limbs or regions 71b, 72b, 73b, and 74b of the middle layer 70b. However, as shown in FIG. 27, the stops 111, 112, 111a, 112a may also be omitted.

Further, for electrically contacting the coils 81, 82, 83 and 84 contacts 85 may be provided on the middle layer 70b, namely on the opposing portions 71b, 72b.

Figure 28:
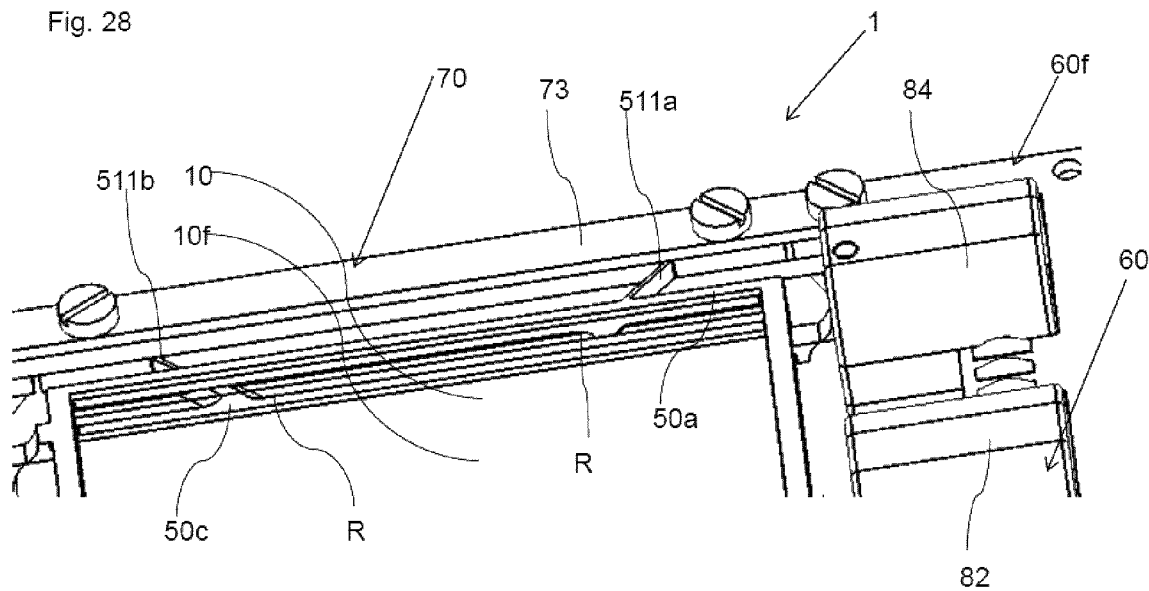
FIG. 28 shows a detail of an embodiment where the middle layer shown in FIG. 25 is not used, but an (e.g. PCB) layer may be arranged on top of the top layer.

However, according to FIG. 28, the middle layer 70b, which may be formed out of a metal or a plastic, may also be absent. Then, recesses R may be made, particularly etched into the first and/or second frame member 50a, 50c as indicated in FIG. 28 to achieve enough clearance for the tilting movement of the two frame members 50a, 50c and attached plate members 10, 10f, and particularly in order to separate the magnetic flux guiding structures as described above to prevent crosstalk between axes.

Figure 29:
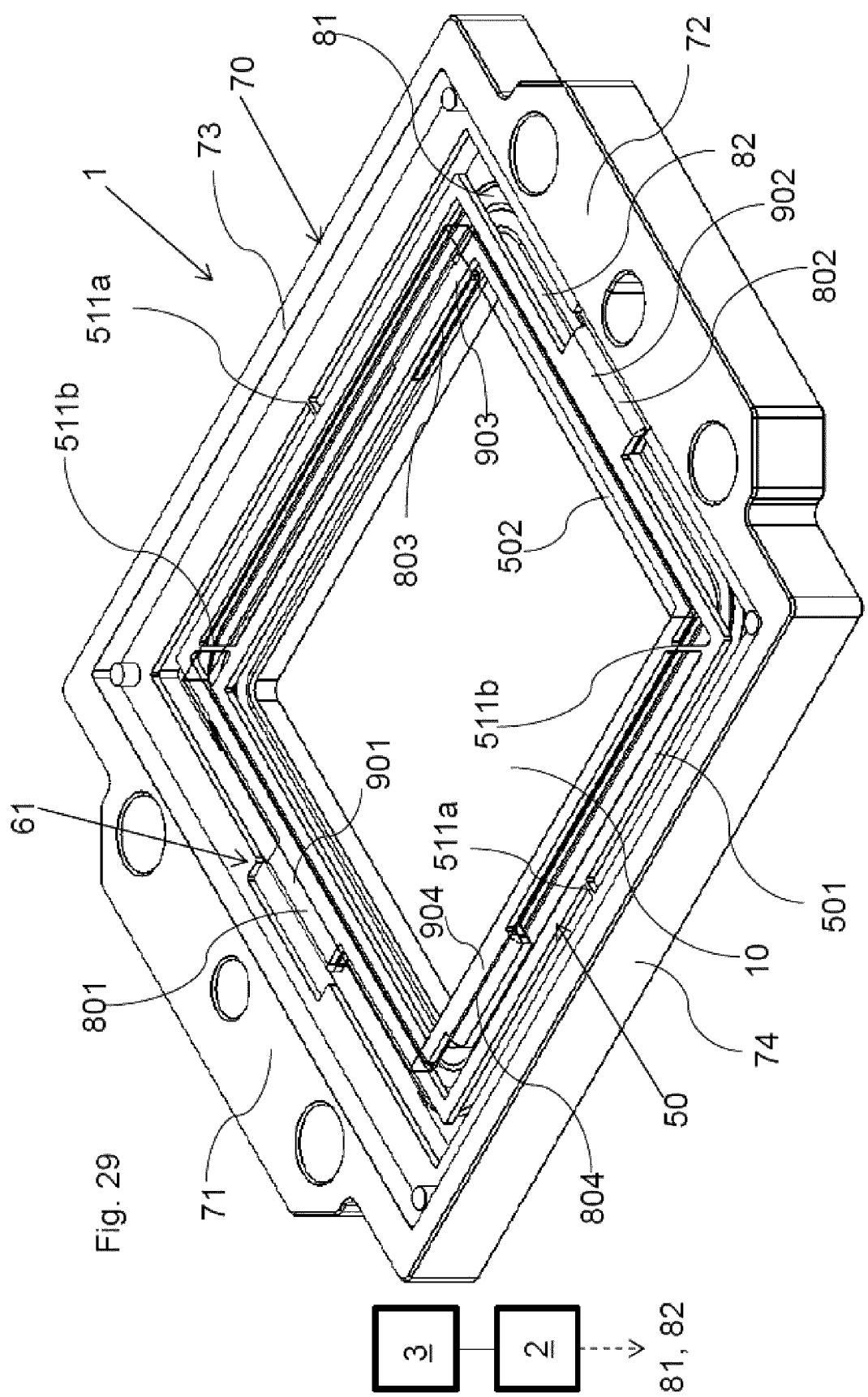
FIG. 29 shows a perspective view of yet another embodiment of the present invention, having an outer frame member and an inner frame member for carrying a single transparent plate member.
Figure 30:
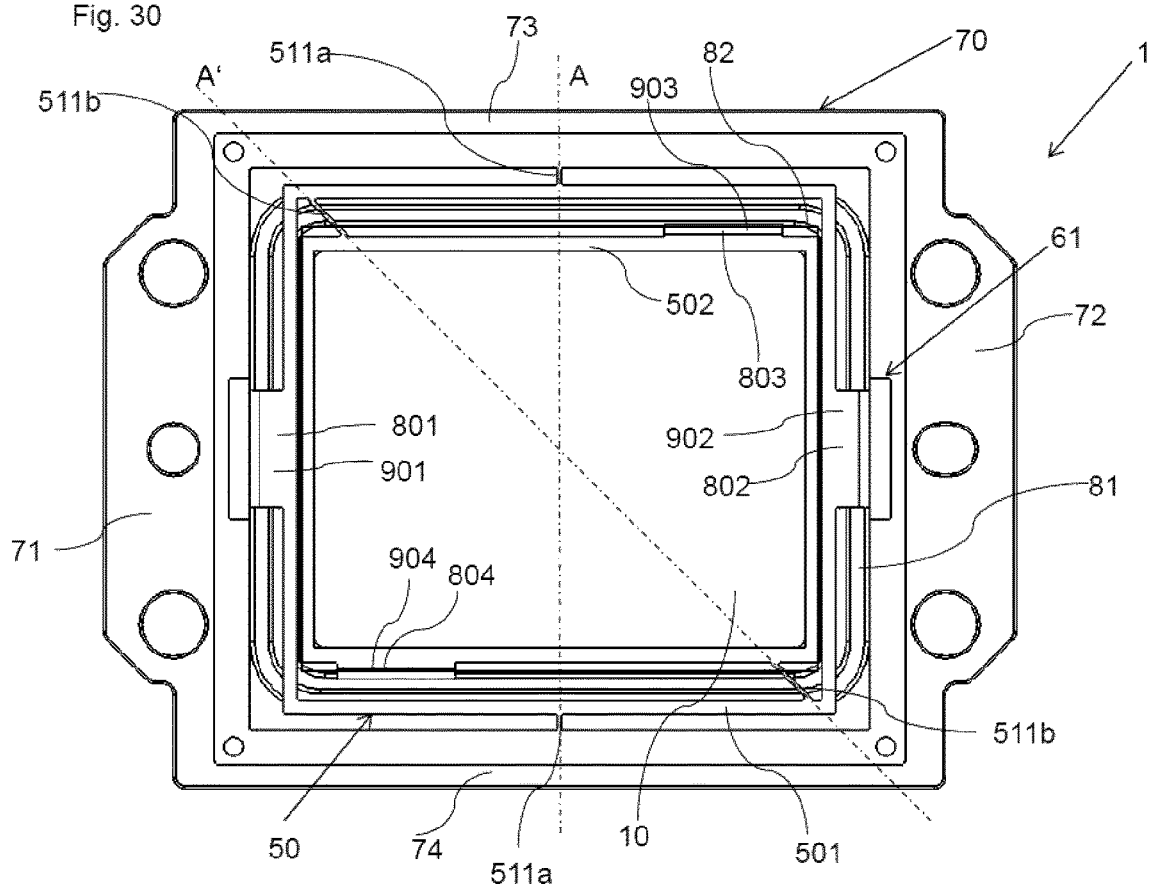
FIG. 30 shows a plan view of the embodiment shown in FIG. 29 using an inner and an outer coil and four magnets for tilting the inner and outer frame member.

Further, FIG. 29 shows in conjunction with FIG. 30 a further embodiment of a device 1 according to the invention. Here, the device comprises again an outer support frame 70 surrounding a carrier 50 for a single transparent plate member 10. In detail, the carrier 50 comprises an inner and an outer frame member 502, 501, wherein the plate member 10 is rigidly mounted to the inner frame member 502, and wherein the outer frame member 501 is elastically coupled to the circumferential/surrounding support frame 70 via first bars 511a so that it can be tilted about a first axis A between a first and a second position, and wherein the inner frame member 502 is elastically coupled to the outer frame member 501 via second bars 511b, so that it can be tilted together with the plate member 10 about a second axis A' between a third and a fourth position with respect to the outer frame member 501. Here, particularly, the first bars 511a define the first axis A that runs perpendicular to the third and fourth region/limb 73, 74 of the support 70, while the second bars 511b define the second axis A' which runs diagonally across the support 70.

In contrast to the reluctance actuator used before, an electromagnetic actuator is used that is designed to exert a Lorentz force on the inner and/or outer frame member 502, 501 to tilt the plate member 10 accordingly about the first and/or second axis A, A' as indicated in FIGS. 29 and 30.

Figure 33:
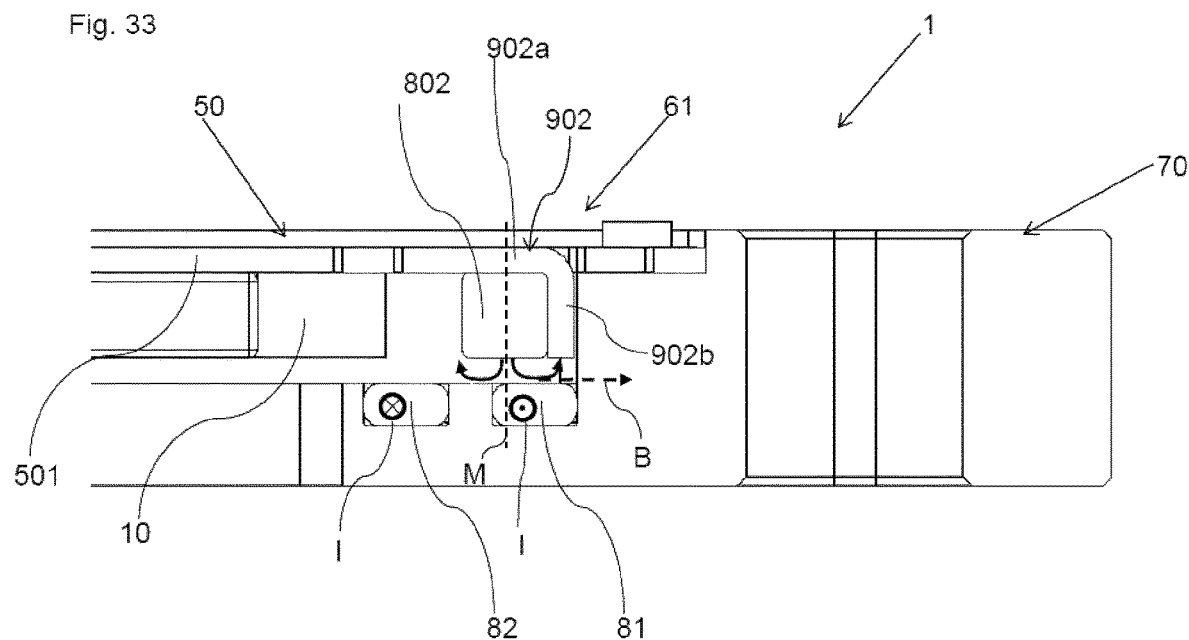
FIG. 33 shows a cross sectional view of the embodiment of FIGS. 29 and 30.

Here, as exemplary shown in FIG. 33, the actuator means 61 is configured to generate a magnetic field B as well as an electrical current I for tilting the outer frame member 501 about the first axis A such that the magnetic field B located plumb-vertically above said current I with respect to a direction M (corresponding e.g. to a magnetization of a used magnet) normal to an extension plane of the outer frame member 501 runs parallel to said extension plane of the outer frame member 501. Similarly, said actuator means 61 is configured to generate a magnetic field B as well as an electrical current I for tilting the inner frame member 502 about the second axis A' such that the magnetic field B located plumb-vertically above said current I with respect to a direction M (corresponding e.g. to a magnetization of a used magnet) normal to an extension plane of the inner frame member 502 runs parallel to said extension plane of the inner frame member 502. Thus, advantageously, the relevant Lorentz forces for tilting the frame members 501, 502 run essentially normal to these frame members 501, 502 which allows a superior control of the tilting movement.

According to the embodiments shown in FIGS. 29, 30, and 33, the actuator means 61 comprises an inner and an outer coil 82, 81 connected to the support frame 70 for generating said currents I, which coils 82, 81 extend circumferentially along the inner and outer frame member 502, 501, wherein a first and an opposing second magnet 801, 802 of the actuator means 61 are arranged on the outer frame member 501 such that they are arranged above the outer coil 81, and wherein a third and an opposing fourth magnet 803, 804 of the actuator means 61 are arranged on the inner frame member 502, such that they are arranged above the inner coil 82. Preferably all magnets 801, 802, 803, 804 comprise a magnetization parallel to direction M, i.e., normal to the respective frame member 501, 502.

Preferably, as shown in FIG. 33, each magnet 801, 802, 803, 804 is arranged adjacent a magnetic flux return structure 901, 902, 903, 904 (with or without air gap) having an L-shaped cross section, i.e., each of these return structures comprises a portion parallel (i.e. 902b in FIG. 33) to the magnetization M as well as a portion (cf. 902a in FIG. 33) running perpendicular to the magnetization M, wherein the latter portion 902a is arranged on a side of the magnet 802 facing away from the coil 81. Analogues configurations are used for the other magnets 801, 803, 804. However the configuration may also be mirrored for opposing two of the four magnets, i.e., the "L" facing outwards.

In alternative embodiments shown in FIGS. 31, 32, 34 to 36, the device 1 uses four coils 81, 82, 83. 84 for moving the plate member 10.

In detail, for generating said currents I, the optical device 1 then comprises a first and an opposing second coil 81 82 which are connected to the support frame 70, as well as a third and an opposing fourth coil 83, 84 which are connected to the support frame 70, too, wherein the optical device 1 further comprises a first magnet 801 that is associated to the first coil 81 and arranged on the outer frame member 501, as well as an opposing second magnet 802 that is associated to the second coil 82 and arranged on the outer frame member 501. Furthermore, the optical device 1 comprises a third magnet 803 that is associated to the third coil 83 and arranged on the inner frame member 502, as well as an opposing fourth magnet 804 that is associated to the fourth coil 84 and arranged on the inner frame member 502, wherein each magnet 801, 802, 803, 804 is now arranged above two parallel sections of its associated coil 81, 82, 83, 84 in a centered fashion to achieve that the magnetic field B above the respective current I is essentially parallel to the extension plane of the respective inner or outer frame member 501, 502 as indicated in FIG. 34.

In order to support this behavior of the generated magnetic field B, each magnet 801, 802, 803, 804 may be embedded into a magnetic flux return structure 901, 902, 903, 904 having a U-shaped cross section (with or without air gap) as indicated in FIG. 36. Here, the respective magnetic flux return structure 901 comprises two portions 901*b*, 901*c* extending perpendicular to the extension plane of the respective frame member 501 on both sides of the magnet 801, which portions are integrally connected by a portion 901*a* of the structure 901 that is arranged on a side of the magnet 801 facing away from the coil 81. However, as shown in FIG. 35, such a magnetic flux return structure may also be omitted.

According to yet another variant, the individual coils 81, 82, 83, 84 may be equipped with a metal core 86 as shown in FIG. 34 in order to influence the generated magnetic field in a suitable manner.

Further, particularly, in contrast to the two coil design, the first bars 511*a* define the first axis A that runs perpendicular to the third and fourth region/limb 73, 74 of the support 70, while the second bars 511*b* define the second axis A' which runs perpendicular to the first and second region/limb 7, 72 of the support 70.

As already described above, the optical device 1 in the embodiments of FIGS. 23 to 36 preferably comprises an electric energy source 2 and a control unit 3 configured to cause the electric energy source 2 to apply a suitable current I to at least one of the electrically conducting coils 81, 82, 82, 84.

Further, the optical device 1 may be configured to measure the position of the inner and/or outer frame members 501, 502 or of the carriers 50*a*, 50*c*, or of the plate member (s) 10, 10*f* using one of: an inductive position measurement, particularly using at least one of said coils 81, 82, 83, 84 or an additional coil, a capacitive position measurement, or a Hall sensor.

Particularly, the control unit 3 described herein may further be configured to control said energy source 2 depending on said measured positions or on other suitable (e.g. feedback) signals.

The device can be used for super resolution imaging but also super resolution projection and is then integrated in an optical assembly, particularly with multiple optical elements. Typical applications include microprojectors, home projectors, business projectors, cinema projectors, entertainment projectors, pico-projectors, head-up displays, head-mounted displays, digital cameras, mobile phone cameras, virtual reality displays, augmented reality displays and machine vision systems.

The invention claimed is:

1. Optical device (1) for enhancing the resolution of an image, comprising:
    a transparent plate member (10) configured for refracting a light beam (20) passing through the plate member (10), which light beam (20) projects an image comprised of rows and columns of pixels (40),
    a carrier (50, 50*a*) to which said transparent plate member (10) is rigidly mounted, wherein the carrier (50, 50*a*) is configured to be tilted between at least a first and a second position about a first axis (A), such that the plate member (10) is tilted between the first and the second position about the first axis (A), whereby said projected image (30) is shifted by a fraction (ΔP) of a pixel, particularly by a half of a pixel, along a first direction (x), and
    an actuator means (60) that is configured to tilt the carrier (50, 50*a*) and therewith the plate member (10) between the first and the second position about the first axis (A) wherein said carrier (50) comprises an inner and an outer frame member (502, 501), wherein the plate member (10) is rigidly mounted to the inner frame member (502), and wherein the outer frame member (501) is elastically coupled to a circumferential support frame (70) via first bars (511*a*) so that the carrier (50) can be tilted about the first axis (A) between the first and the second position, and wherein the inner frame member (502) is elastically coupled to the outer frame member (501) via second bars (511*b*), so that it can be tilted together with the plate member (10) about a second axis (A') between a third and a fourth position with respect to the outer frame member (501).

2. Optical device according to claim 1, characterized in that said actuator means (60) is formed as a reluctance actuator means that is designed to exert a reluctance force on the carrier (50, 50*a*) to tilt the carrier (50, 50*a*) and therewith the plate member (10) between the first and the second position about the first axis (A).

3. Optical device according to claim 2, characterized in that the reluctance actuator means (60) comprises a first electrically conducting coil (81) mounted on a first magnetic flux return structure (91) that is connected to the support (70), and a first magnetic flux guiding structure (101) connected to the carrier (50, 50*a*) or formed by the carrier (50*a*), wherein said first magnetic flux guiding structure (101) is separated from said first magnetic flux return structure (91) by a first gap (G, G1), and wherein particularly the reluctance actuator means (60) comprises a second electrically conducting coil (82) mounted on a second magnetic flux return structure (92) that is connected to the support (70), and a second magnetic flux guiding structure (102) connected to the carrier (50, 50*a*) or formed by the carrier (50*a*), wherein said second magnetic flux guiding structure (102) is separated from said second magnetic flux return structure (92) by a second gap (G', G2).

4. Optical device according to claim 3, characterized in that the first magnetic flux return structure (91) is arranged on a first region (71) of the support (70), wherein particularly the second magnetic flux return structure (92) is arranged on a second region (72) of the support (70), wherein particularly said two regions (71, 72) face each other, and wherein particularly the carrier (50, 50a) is arranged between the two return structures (91, 92).

5. Optical device according to claim 3, characterized in that the carrier (50, 50a) is elastically coupled to said support (70) so that a restoring force is generated when the carrier (50, 50a) is tilted into the first position or into the second position, which restoring force tries to pivot the carrier (50, 50a) back into an initial resting position.

6. Optical device according to claim 1, characterized in that the optical device (1) comprises a first stopping means (111) configured to stop the carrier (50, 50a) in the first position, as well as a second stopping means (112) configured to stop the carrier (50, 50a) in the second position.

7. Optical device according to claim 6, characterized in that the first stopping means (111) provides a stop for the first magnetic flux guiding structure (101) when the carrier (50) arrives in the first position, and wherein particularly the second stopping means (112) provides a stop for the second magnetic flux guiding structure (102) when the carrier (50) arrives in the second position, wherein particularly the first stopping means (111) comprises a surface area (91a, 71a) of the first magnetic flux return structure (91) or of the support (70), and wherein particularly the second stopping means (112) comprises a surface area (92a, 72a) of the second magnetic flux return structure (92) or of the support (70), and wherein particularly the first and the second stopping means (111, 112) each comprise a damping member (121, 122) arranged on the respective surface area (91a, 92a) for damping an impact of the respective magnetic flux guiding structure (101, 102) on the respective surface area (91a, 92a; 71a, 72a).

8. Optical device according claim 3, characterized in that the first gap (G, G1) is at least delimited by a face side (91b) of the first magnetic flux return structure (91) and a face side (101b) of the associated first magnetic flux guiding structure (101), and wherein particularly the second gap (G', G2) is at least delimited by a face side (92b) of the second magnetic flux return structure (92) and a face side (102b) of the associated second magnetic flux guiding structure (102), wherein particularly the first gap (G) is further delimited by said surface area (91a) of the first magnetic flux return structure (91), and wherein particularly the second gap (G') is further delimited by said surface area (92a) of the second magnetic flux return structure (92).

9. Optical device according to claim 1, characterized in that the optical device (1) comprises a spring member (130) connected to the carrier (50), as well as a curved roll-off surface (130a), wherein the spring member (130) is configured to roll off on said roll-off surface (130a) when the carrier (50) is tilted into the first or into the second position.

10. Optical device according to claim 3, characterized in that the optical device (1) comprises an electric energy source (2) and a control unit (3) configured to cause the electric energy source (2) to apply a current to at least one of the electrically conducting coils (81, 82, 82, 84).

11. Optical device according to claim 10, characterized in that the control unit (3) is configured to apply a first current to said first coil (81) such that when the first current is applied to the first coil (81), magnetic flux generated by the first coil (81) is guided by the first magnetic flux return structure (91) and the first magnetic flux guiding structure (101) via said first gap (G, G1) resulting in a reluctance force that tilts the carrier (50, 50a) into the first position so as to reduce said first gap (G, G1), and wherein the control unit (3) is configured to apply a second current to said second coil (82) such that when the second current is applied to the second coil (82), magnetic flux generated by the second coil (82) is guided by the second magnetic flux return structure (92) and the second magnetic flux guiding structure (102) via said second gap (G', G2) resulting in a reluctance force that tilts the carrier (50, 50a) into the second position so as to reduce said second gap (G', G2), wherein particularly the control unit (3) is configured to cause the electric energy source (2) to apply the first current and the second current such that the carrier (50, 50a) is tilted back and forth between the first and the second position according to a predefined pattern.

12. Optical device according to claim 10, characterized in that the control unit (3) is configured to cause the electric energy source (2) to apply a current to said second coil (82) so as to decelerate the carrier (50, 50a) when the latter approaches the first position, and/or wherein the control unit (3) is further configured to cause the electric energy source (2) to apply a current to said first coil (81) so as to decelerate the carrier (50, 50a) when the latter approaches the second position.

13. Optical device according to claim 10, characterized in that the control unit (3) is configured to cause the electric energy source (2) to apply a current to the first coil (81) so as to hold the carrier (50, 50a) in its first position over a pre-defined time period, and wherein particularly the control unit (3) is configured to cause the electric energy source (2) to a apply a current to the second coil (82) so as to hold the carrier (50, 50a) in its second position over a pre-defined time period.

14. Optical device according to claim 1, characterized in that the carrier (50) comprises a first carrier member (52) to which the first and the second magnetic flux guiding structures (101, 102) are connected, wherein particularly the first magnetic flux guiding structure (101) is connected to a first section of the first carrier member (52), which first section faces a second section of the first carrier member (52), to which second section the second magnetic flux guiding structure (102) is connected, wherein particularly the first carrier member (52) is connected to a second carrier member (53) by a bar (513) that is supported on the support (70), wherein the first carrier member (52) is arranged in an aperture (700) formed by the support (70), and wherein the second carrier member (53), to which the plate member (10) is connected is arranged outside said aperture (700), so that a leg (74) of the support (70) extends between the first and the second carrier member (52, 53).

15. Optical device according to claim 1, characterized in that the reluctance actuator means (60) further comprises a third electrically conducting coil (83) mounted on a third magnetic flux return structure (93) that is connected to the support (70), and a third magnetic flux guiding structure (103) connected to the carrier (50), wherein said third magnetic flux guiding structure (103) is separated from said third magnetic flux return structure (93) by a third gap (G"), and wherein the reluctance actuator means comprises a fourth electrically conducting coil (84) mounted on a fourth magnetic flux return structure (94) that is connected to the support (70), and a fourth magnetic flux guiding structure (104) connected to the carrier (50), wherein said fourth magnetic flux guiding structure (104) is separated from said fourth magnetic flux return structure (94) by a fourth gap (G''').

16. Optical device according to claim 4, characterized in that the third magnetic flux return structure (93) is arranged on the first region (71) of the support besides the first magnetic flux return structure (91), and the fourth magnetic flux return structure (94) is arranged on the second region (72) of the support (70) besides the second magnetic flux return structure (92).

17. Optical device according to claim 15, characterized in that the first and the second magnetic flux return structure (91, 92) are arranged at a first height (z1) with respect to the support (70), and wherein the third and the fourth magnetic flux return structure (93, 94) are arranged at a different second height (z2) with respect to the support (70), and wherein particularly the control unit (3) is configured to cause the electric energy source (2) to apply a first current to said first coil (81) and a fourth current to said fourth coil (84) so that two reluctance forces are generated that reduce the first and the fourth gap (G, G''') at the same time and tilt the carrier (50) into its first position, and wherein the control unit (3) is configured to cause the electric energy source (2) to apply a second current to said second coil (82) and a third current to said third coil (83) so that two reluctance forces are generated that reduce the second and the third gap (G', G'') at the same time and tilt the carrier (50) into its second position.

18. Optical device according to claim 1, characterized in that the optical device (1) comprises
   a further transparent plate member (10*f*) configured for refracting said light beam (20) extending along the other plate member (10),
   a further carrier (50*f*, 50*c*) to which said further transparent plate member (10*f*) is rigidly mounted, wherein the further carrier (50*f*, 50*c*) is configured to be tilted between a third and a fourth position about a second axis (A'), such that the further plate member (10*f*) is tilted between the third and the fourth position about the second axis (A'), whereby said projected image is shifted by a fraction of a pixel along a second direction, and
   a further actuator means (60*f*) that is configured to tilt the further carrier (50*f*, 50*c*) and therewith the further plate member (10*f*) between the third and the fourth position about the second axis (A'), wherein said further actuator means (60*f*) is formed as a further reluctance actuator means that is designed to exert a reluctance force on the further carrier (50*f*, 50*c*) to tilt the further carrier (50*f*, 50*c*) and therewith the further plate member (10*f*) between the third and the fourth position about the second axis (A'), and
   wherein particularly the further carrier (50*f*) is mounted to a further support (70*f*) that is connected to the support (70) such that the further carrier (50*f*) can be tilted about the second axis (A'), or wherein the further carrier (50*f*) is mounted to the support (70), particularly integrally connected to the support (70), such that it can be tilted about the second axis (A').

19. Optical device according to claim 15, characterized in that the third magnetic flux return structure (93) is arranged on a third region (73) of the support (70), while the fourth magnetic flux return structure (94) is arranged on a fourth region (74) of the support (70), wherein said two regions (73, 74) face each other, and wherein the carrier (50) is arranged between the two return structures (93, 94), and wherein the third and the fourth region (73, 74) each connect the first and the second region to each other so that the support (70) is formed as a circumferential support frame.

20. Optical device according to claim 19, characterized in that the first magnetic flux return structure (91) is arranged at a first height (z1) with respect to the support (70), and wherein the second magnetic flux return structure (92) is arranged at a different second height (z2) with respect to the support (70), and wherein the third magnetic flux return structure (93) is arranged at the first height (z1), and wherein the fourth magnetic flux return structure (94) is arranged at the second height (z2), wherein particularly the control unit (3) is configured to cause the electric energy source (2) to apply a first current to said first coil (81) and at the same time a second current to said second coil (82) so that two reluctance forces are generated that reduce the first and the second gap (G, G') at the same time and tilt the carrier (50) about the first axis (A) from the first resting position into its second position, and wherein the control unit (3) is configured to cause the electric energy source (2) to apply a third current to said third coil (83) and at the same time a fourth current to said fourth coil (84) so that two reluctance forces are generated that reduce the third and the fourth gap (G'',G''') at the same time and tilt the carrier (50) about a second axis (A') from a third resting position into a fourth position.

21. Optical device according to claim 19, characterized in that the carrier (50) comprises a circumferential second frame member (550), that is elastically coupled to the first frame member (501), particularly via two second bars (561), such that the second frame member (550) can be tilted between a third and a fourth position about a second axis (A') with respect to the first frame member (501), and wherein the first frame member (501) is elastically coupled to the support (70), particularly via the two first bars (511), so that the first frame member (501) together with the second frame member (550) can be tilted about the first axis (A) between the first and the second position, and wherein the third magnetic flux guiding structure (103) is connected to a first section (551) of the second frame member (550), which first section (551) faces a second section (552) of the second frame member (550) to which second section (552) the fourth magnetic flux guiding structure (94) is connected, and wherein particularly, the first magnetic flux guiding structure (101) is connected to a third section (553) of the second frame member (550), which third section (553) faces a fourth section (554) of the second frame member (550) to which fourth section (554) the fourth magnetic flux guiding structure (104) is connected.

22. Optical device according to claim 1, characterized in that the further carrier (50*c*) is formed as a circumferential second frame member (50*c*) to which said transparent further plate member (10*f*) is connected, wherein said second frame member (50*c*) is elastically coupled via at least a second bar (511*b*), particularly two second bars (511*b*), to said support (70).

23. Optical device according to claim 1, characterized in that the optical device (1) is configured to guide magnetic flux generated by the actuator means (60, 60*f*) via said bars (511*a*, 511*b*).

24. Optical device according to claim 22, characterized in that the further reluctance actuator means (60*f*) comprises a third electrically conducting coil (83) mounted on a third magnetic flux return structure (93) that is connected to the support (70), and a third magnetic flux guiding structure (103) formed by the second frame member (50*c*), wherein said third magnetic flux guiding structure (103) is separated from said third magnetic flux return structure (93) by a third gap (G3), and wherein the further reluctance actuator (60*f*) means comprises a fourth electrically conducting coil (84) mounted on a fourth magnetic flux return structure (94) that is connected to the support (70), and a fourth magnetic flux guiding structure (104) formed by the second frame member (50*c*), wherein said fourth magnetic flux guiding structure (104) is separated from said fourth magnetic flux return structure (94) by a fourth gap (G4).

25. Optical device according to claim 1, characterized in that the support (70), the first frame member (50a), and the second frame member (50c) are formed by at least a top layer (70a) and a bottom layer (70c) which are arranged on top of each other.

26. Optical device according to claim 25, characterized in that the bottom layer (70c) comprises a shape that is identical to the shape of the top layer (70a), but the bottom layer (70c) is attached to the top layer such that the bottom layer (70c) is rotated with respect to the top layer by 180° about an axis lying in the extension plane of the bottom layer (70c).

27. Optical device according to claim 1, characterized in that the top layer (70a) comprises an outer frame member (700a) that is integrally connected to the first frame member (50a) via said first bars (511a), wherein the outer frame member (700a) surrounds the first frame member (50a), and/or that the bottom layer (70c) comprises an outer frame member (700c) that is integrally connected to the second frame member (50c) via said second bars (511b), wherein the outer frame member (700c) surrounds the second frame member (50c).

28. Optical device according to claim 25, characterized in that the outer frame member (700a) of the top layer (70a) comprises discontinuities (75a, 76a) for blocking magnetic flux and/or that the outer frame member (700c) of the bottom layer (70c) comprises discontinuities (75c, 76c) for blocking magnetic flux.

29. Optical device according to claim 25, characterized in that the top and the bottom layer (70a, 70c) are connected by first fastening means (S1) that are designed to guide magnetic flux from the top layer (70a) to the bottom layer (70c) or vice versa.

30. Optical device according to claim 25, characterized in that the top and the bottom layer (70a, 70c) are connected by second fastening means (S2) that are designed to block or suppress the passage of magnetic flux from the top layer (70a) to the bottom layer (70c) or vice versa.

31. Optical device according to claim 3, characterized in that the top layer (70a) comprises two portions (94, 93) protruding inwards from the outer frame member (700a) of the top layer (70a), which portions form the third and fourth magnetic flux return structure (93, 94), and/or in that the bottom layer (70c) comprises two portions (91, 92) protruding inwards from the outer frame member (700c) of the bottom layer (70c), which portions form the first and second magnetic flux return structure (91, 92).

32. Optical device according to claim 25, characterized in that the support (70) comprises a further circumferential layer (70b), which is particularly arranged between the top and the bottom layer (70a, 70c).

33. Optical device according to claim 32, characterized in that the further circumferential layer (70b) is configured to block or suppress passage of magnetic flux from the top layer (70a) to the bottom layer (70c) or vice versa.

34. Optical device according to claim 32, characterized in that the further circumferential layer (70b) comprises a circumferential frame member (700b) and portions protruding inwards from said circumferential frame member (700b), which portions form stops (111, 112, 111a, 112a) for the first and the second frame member (50a, 50c).

35. Optical device according to claim 25, characterized in that the top and the bottom layer (70a, 70c) are arranged on top of one another without an intermediary layer in between the top and the bottom layer (70a, 70c), wherein one or several regions (R) of the first and/or second frame member (50a, 50c) are etched or removed, so as to provide a clearance between the first and the second frame member (50a, 50c) that allows said frame members (50a, 50c) to tilt about the respective axis (A, A') and/or so as to hinder magnetic flux from passing from the top layer (70a) to the bottom layer (70c) or vice versa.

36. Optical device according to claim 1, characterized in that the actuator means (61) is an electromagnetic actuator (61) that is designed to exert a Lorentz force on the inner and/or outer frame member (502, 501) to tilt the plate member (10) about the first and/or second axis (A, A').

37. Optical device according to claim 1, characterized in that the actuator means (61) is configured to generate a magnetic field (B) as well as an electrical current (I) for tilting the outer frame member (501) about the first axis (A) such that the magnetic field (B) located plumb-vertical above said current (I) with respect to a direction (M) normal to an extension plane of the outer frame member (501) runs parallel to said extension plane of the outer frame member (501) and/or in that the actuator means (61) is configured to generate a magnetic field (B) as well as an electrical current (I) for tilting the inner frame member (502) about the second axis (A') such that the magnetic field (B) located plumb-vertical above said current (I) with respect to a direction normal to an extension plane of the inner frame member (502) runs parallel to said extension plane of the inner frame member (502).

38. Optical device according to claim 36, characterized in that the actuator means (61) comprises an inner and an outer coil (82, 81) connected to the support frame (70) for generating said currents (I), which coils (82, 81) extend circumferentially along the inner and outer frame member (502, 501), wherein a first and an opposing second magnet (801, 802) of the actuator means (61) are arranged on the outer frame member (501) such that they are arranged above the outer coil (81), and wherein a third and an opposing fourth magnet (803, 804) of the actuator means (61) are arranged on the inner frame member (502), such that they are arranged above the inner coil (82).

39. Optical device according to claim 38, characterized in that each magnet (801, 802, 803, 804) is arranged adjacent a magnetic flux return structure (901, 902, 903, 904) having an L-shaped cross section.

40. Optical device according to claim 39, characterized in that an air gap is provided between each magnet (801, 802, 803, 804) and its magnetic flux return structure (901, 902, 903, 904), particularly in a direction parallel to an extension plane of the support frame (70).

41. Optical device according to claim 37, characterized in that for generating said currents (I) the optical device comprises a first and an opposing second coil (81 82) which are connected to the support frame (70), as well as a third and an opposing fourth coil (83, 84) which are connected to the support frame (70), too, wherein the optical device further comprises a first magnet (801) that is associated to the first coil (81) and arranged on the outer frame member (501), as well as an opposing second magnet (802) that is associated to the second coil (82) and arranged on the outer frame member (501), and wherein the optical device further comprises a third magnet (803) that is associated to the third coil (83) and arranged on the inner frame member (502), as well as an opposing fourth magnet (804) that is associated to the fourth coil (84) and arranged on the inner frame member (502), and wherein each magnet (801, 802, 803, 804) is arranged above two parallel sections of its associated coil (81, 82, 83, 84) in a centered fashion.

42. Optical device according to claim 41, characterized in that each magnet (801, 802, 803, 804) is embedded into a magnetic flux return structure (901, 902, 903, 904) having a U-shaped cross section.

43. Optical device according to claim 41, characterized in that each magnet (801, 802, 803, 804) is embedded into a magnetic flux return structure (901, 902, 903, 904) having a U-shaped cross section.

44. Optical device according to claim 43, characterized in that an air gap is provided on both sides of each magnet (801, 802, 803, 804) between the respective magnet (801, 802, 803, 804) and its magnetic flux return structure (901, 902, 903, 904).

45. Optical device according to claim 1, characterized in that the optical device (1) is configured to measure the position of said frame members (50a, 50c, 501, 502) or of the plate member (10) using one of: an Inductive position measurement, particularly using at least one of said coils or an additional coil, a capacitive position measurement, a Hall sensor.

46. Optical system configured to project an image onto an image sensor or onto a screen, wherein the optical system comprises an optical device according to claim 1 for shifting a light beam projecting said image.

* * * * *